(12) United States Patent
Little et al.

(10) Patent No.: US 9,224,378 B2
(45) Date of Patent: *Dec. 29, 2015

(54) SYSTEMS AND METHODS THEREOF FOR DETERMINING A VIRTUAL MOMENTUM BASED ON USER INPUT

(71) Applicant: APPLE INC., Cupertino, CA (US)

(72) Inventors: Alec H. Little, Woodside, CA (US); Eli T. Manjarrez, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,464

(22) Filed: Nov. 20, 2014

(65) Prior Publication Data

US 2015/0154949 A1 Jun. 4, 2015

Related U.S. Application Data

(63) Continuation of application No. 13/787,731, filed on Mar. 6, 2013, now Pat. No. 8,940,992.

(60) Provisional application No. 61/607,585, filed on Mar. 6, 2012.

(51) Int. Cl.
*A63H 5/00* (2006.01)
*G04B 13/00* (2006.01)
(Continued)

(52) U.S. Cl.
CPC ............... *G10H 7/00* (2013.01); *G06F 3/011* (2013.01); *G06F 3/017* (2013.01); *G10H 1/0008* (2013.01);
(Continued)

(58) Field of Classification Search
CPC . A01B 12/006; G10H 7/00; G10H 2230/015; G10H 2230/021; G10H 1/0066; G10H 1/0008; G10H 1/0575; G10H 1/386; G10H 2210/00; G06F 3/011; G06F 3/017
USPC ............. 84/626, 627, 662, 663; 715/700, 727
See application file for complete search history.

(56) References Cited

U.S. PATENT DOCUMENTS

| | | |
|---|---|---|
| 5,905,223 A | 5/1999 | Goldstein |
| 6,915,488 B2 * | 7/2005 | Omori et al. ................. 715/773 |

(Continued)

FOREIGN PATENT DOCUMENTS

EP 2045796 A1 4/2009

OTHER PUBLICATIONS

"Direct Note Access," product information Celemony Software GmbH (2012).

(Continued)

*Primary Examiner* — Jeffrey Donels
(74) *Attorney, Agent, or Firm* — Kilpatrick Townsend & Stockton LLP

(57) ABSTRACT

A computer-implemented method including generating a user interface implemented on a touch-sensitive display configured to generate a virtual dual flywheel system for modulating a lifecycle of a musical note or chord. The dual flywheel system (DFS) includes a first VFS and a second VFS, where the first virtual flywheel system series connected to the second virtual flywheel system such that an output of the first virtual flywheel system is coupled to an input of the second virtual flywheel system. Upon receiving a user input on the user interface, the dual flywheel system determines a virtual momentum for the first virtual flywheel based on the user input and a predetermined mass coefficient of the first virtual flywheel system, and determines a virtual momentum for the second virtual flywheel based on the virtual momentum of the first virtual flywheel system and a predetermined mass coefficient of the second virtual flywheel.

20 Claims, 16 Drawing Sheets

(51) Int. Cl.
| | | |
|---|---|---|
| *G10H 7/00* | (2006.01) | |
| *G06F 3/01* | (2006.01) | |
| *G10H 1/00* | (2006.01) | |
| *G10H 1/057* | (2006.01) | |
| *G10H 1/38* | (2006.01) | |
| *G10H 1/02* | (2006.01) | |
| *G10H 1/28* | (2006.01) | |

(52) U.S. Cl.
CPC ............... *G10H 1/0066* (2013.01); *G10H 1/02* (2013.01); *G10H 1/0575* (2013.01); *G10H 1/28* (2013.01); *G10H 1/38* (2013.01); *G10H 1/386* (2013.01); *G10H 7/008* (2013.01); *G10H 2210/095* (2013.01); *G10H 2220/096* (2013.01); *G10H 2220/106* (2013.01); *G10H 2220/201* (2013.01); *G10H 2220/241* (2013.01); *G10H 2230/015* (2013.01); *G10H 2230/021* (2013.01)

(56) References Cited

U.S. PATENT DOCUMENTS

| | | | |
|---|---|---|---|
| 6,933,432 B2 | 8/2005 | Shteyn et al. | |
| 7,915,514 B1 | 3/2011 | Shrem et al. | |
| 8,940,992 B2 | 1/2015 | Little et al. | |
| 2008/0307945 A1 | 12/2008 | Gatzsche et al. | |
| 2009/0102817 A1* | 4/2009 | Bathiche et al. | 345/184 |
| 2011/0050595 A1 | 3/2011 | Lundback et al. | |
| 2011/0100198 A1 | 5/2011 | Gatzsche et al. | |
| 2012/0174735 A1 | 7/2012 | Little et al. | |
| 2014/0083279 A1 | 3/2014 | Little et al. | |

OTHER PUBLICATIONS

Partial Search Report for International Patent Application No. PCT/US2013/029466, mailed on Aug. 7, 2013, 8 pages.

International Search Report and Written Opinion for International Patent Application No. PCT/US2013/029466, mailed on Nov. 7, 2013, 23 pages.

International Preliminary Report on Patentability for Application No. PCT/US2013/029466, mailed on Sep. 18, 2014, 17 pages.

Notice of Allowance for U.S. Appl. No. 13/787,731, mailed Sep. 29, 2014, 8 pages.

Non-Final Office Action for U.S. Appl. No. 13/787,731, mailed Apr. 24, 2014, 8 pages.

* cited by examiner

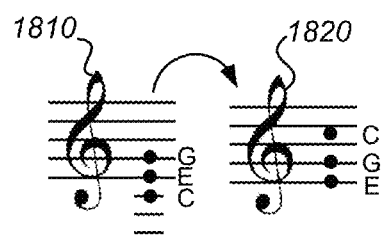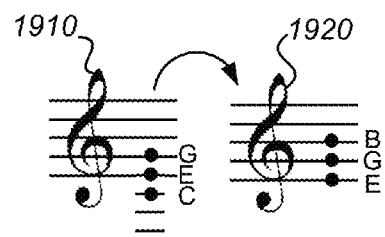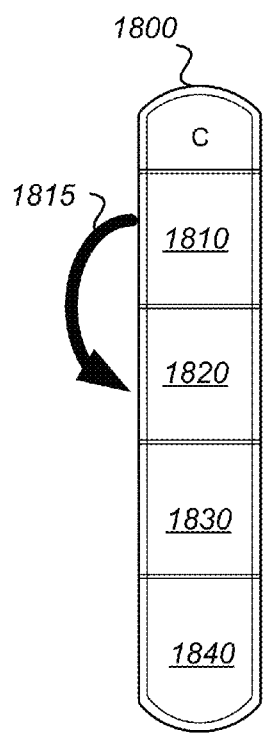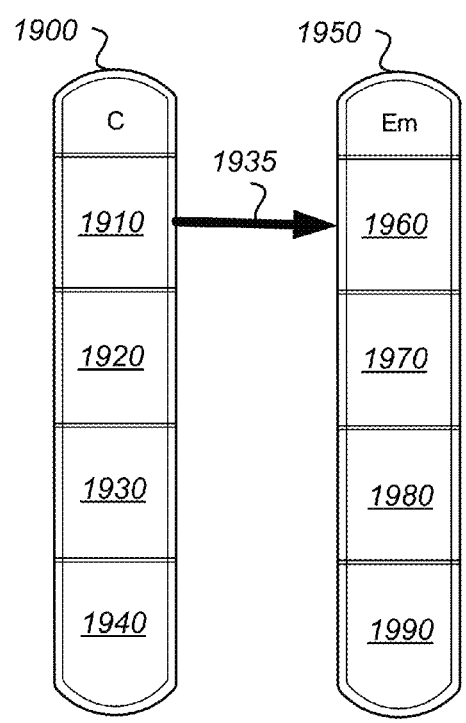
FIG. 18    FIG. 19

SYSTEMS AND METHODS THEREOF FOR DETERMINING A VIRTUAL MOMENTUM BASED ON USER INPUT

CROSS-REFERENCE TO RELATED APPLICATIONS

The present application is a Continuation of U.S. application Ser. No. 13/787,731, filed Mar. 6, 2013, and claims benefit under 35 U.S.C. §119 of U.S. Provisional Patent Application No. 61/607,585, filed on Mar. 6, 2012, and entitled "DETERMINING THE CHARACTERISTIC OF A PLAYED NOTE ON A VIRTUAL INSTRUMENT," both of which are herein incorporated by reference in their entirety for all purposes.

BACKGROUND

Virtual musical instruments, such as MIDI-based or software-based keyboards, guitars, basses, and the like, typically have user interfaces that closely resemble the actual instrument. For example, a virtual piano will have an interface configured as a touch-sensitive representation of a keyboard, or a virtual guitar will have an interface configured as a touch-sensitive fret board. While these types of interfaces may be intuitive, they require that the user understands how to play notes, chords, chord progressions, etc., on a real musical instrument in order to implement them on the virtual musical instrument, such that the user is able to produce pleasing melodic or harmonic sounds from the virtual instrument. Such requirements may be problematic for musicians with little to no experience with the particular corresponding instrument or in music composition in general. Furthermore, some instruments may not lend themselves to virtual replicas requiring similar input articulations on the user interface. For example, brass or orchestral instruments may require air pressure or handheld instruments in order to play a note, much less a chord. MIDI keyboards are typically used as samplers to recreate these orchestral sounds and, as discussed above, require some level of keyboard proficiency and musical knowledge to produce pleasing melodic or harmonic phrases.

Not all users who would enjoy playing a virtual instrument are musicians who know how to form chords, construct chord progressions, or compose diatonic harmony within a musical key. Furthermore, users who do know how to form chords and play chord progressions on a real instrument may find it difficult to recreate music with the same musical proficiency on the user interface due to the lack of tactile stimulus (e.g., weighted keys, strings, bow, etc.), which the user may be accustomed to.

These problems lead to frustration and make a system less useful, less enjoyable, and less popular. Therefore, a need exists for a system that strikes a balance between simulating traditional musical instruments and providing an optimized user interface that allows effective musical input and performance, and that allows even non-musicians to experience a musical performance on a virtual instrument.

BRIEF DESCRIPTION OF THE DRAWINGS

FIG. 18 illustrates a chord touch region including four touch zones with chord configurations that change by a minimum number of notes between chord inversions, according to an embodiment of the invention.

FIG. 19 illustrates a chord touch region including four touch zones with chord configurations that change by a minimum number of notes between chords, according to an embodiment of the invention.

DETAILED DESCRIPTION

The following disclosure describes systems, methods, and products for musical performance and/or input. Various embodiments can include or communicatively couple with a wireless touch screen device. A wireless touch screen device including a processor can implements the methods of various embodiments. Many other examples and other characteristics will become apparent from the following description.

A musical performance system can accept user inputs and audibly sound one or more tones. User inputs can be accepted via a user interface. A musical performance system, therefore, bears similarities to a musical instrument. However, unlike most musical instruments, a musical performance system is not limited to one set of tones. For example, a classical violin or a classical cello can sound only one set of tones, because a musician's interaction with the physical characteristics of the instrument produces the tones. On the other hand, a musical performance system can allow a user to modify one or more tones in a set of tones or to switch between multiple sets of tones. A musical performance system can allow a user to modify one or more tones in a set of tones by employing one or more effects units. A musical performance system can allow a user to switch between multiple sets of tones. Each set of tones can be associated with a patch (e.g., channel strip (CST) file).

Figure 14:
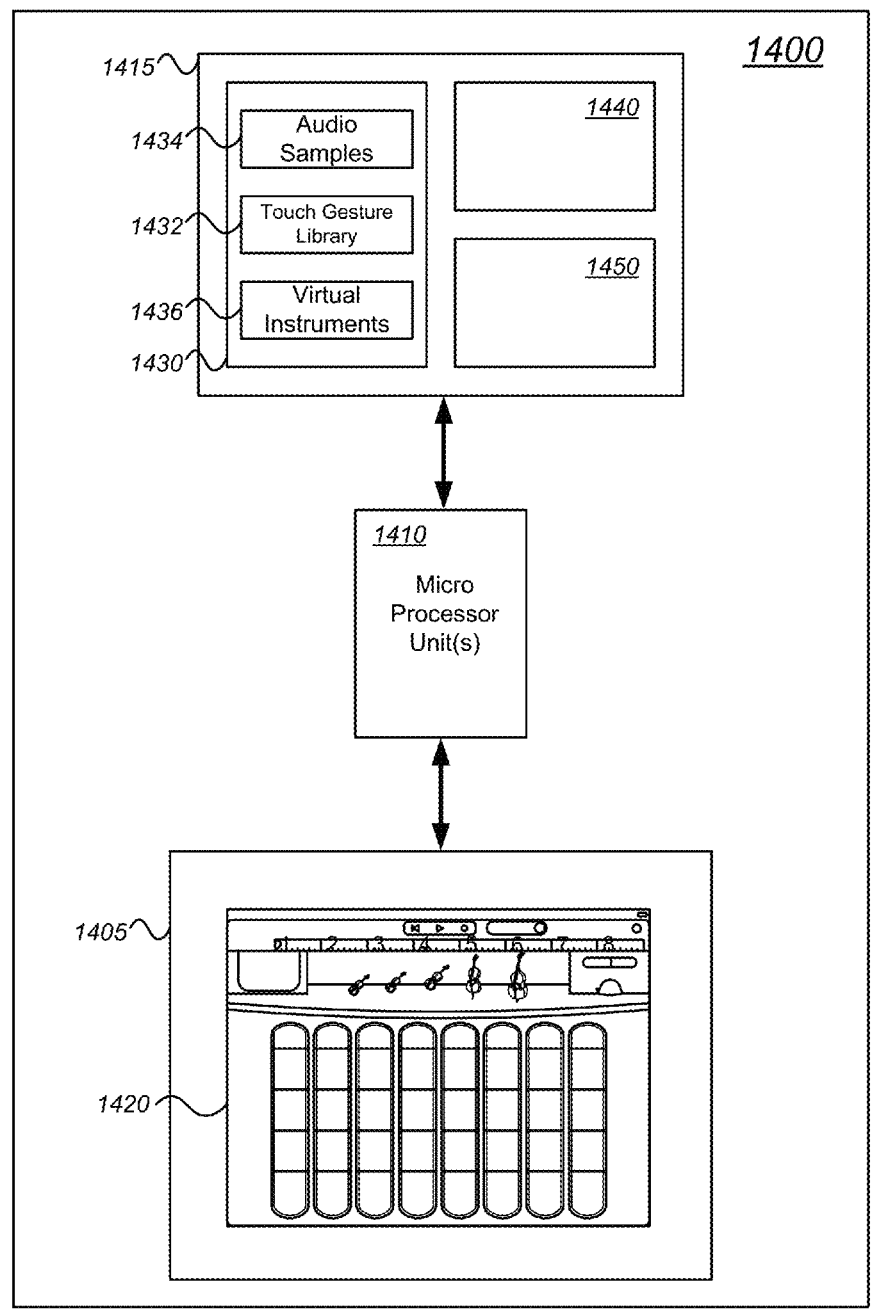
FIG. 14 illustrates an example of a musical performance system that can enable a user to compose and create music with a number of virtual instruments on a music application, according to an embodiment of the invention.

FIG. 14 illustrates an example of a musical performance system that can enable a user to compose and create music with a number of virtual instruments on a music application, according to an embodiment of the invention. Musical performance system 1400 can include multiple subsystems such as a display 1405, one or more processing units 1410, and a storage subsystem 1415. One or more communication paths can be provided to enable one or more of the subsystems to communicate with and exchange data with one another. The various subsystems in FIG. 14 can be implemented in software, in hardware, or combinations thereof. In some embodiments, the software can be stored on a transitory or non-transitory computer readable storage medium and can be executed by one or more processing units.

It should be appreciated that musical performance system 1400 as shown in FIG. 14 can include more or fewer components than those shown in FIG. 14, can combine two or more components, or can have a different configuration or arrangement of components. In some embodiments, musical performance system 1400 can be a part of a portable computing device, such as a tablet computer, a mobile telephone, a smart phone, a desktop computer, a laptop computer, a kiosk, etc.

Display 1405 in some embodiments can provide an interface that allows a user to interact with musical performance system 1400. Display 1405 can be a monitor or a screen in some embodiments. Through the interface, the user can view and interact with a GUI 1420 of a musical performance system 1400. In some embodiments, display 1405 can include a touch-sensitive interface (also sometimes referred to as a touch screen) that can both display information to the user and receive inputs from the user. Processing unit(s) 1410 can include one or more processors that each have one or more cores. In some embodiments, processing unit(s) 1410 can execute instructions stored in storage subsystem 1415. System 1400 may also include other types of user input and output mechanisms such as allowing a user to provide an input based on received accelerometer or gyroscope sensor readings (internal to system 1400) or provide output such as haptic output based on a desired musical characteristic.

Storage subsystem 1415 can include various memory units such as a system memory 1430, a read-only memory (ROM) 1440, and a permanent storage device 1450. The system memory can be a read-and-write memory device or a volatile read-and-write memory, such as dynamic random access memory. The system memory can store some or all of the instructions and data that the processor needs at runtime. The ROM can store static data and instructions that are needed by processing unit(s) 1410 and other modules of system 1400. The permanent storage device can be a read-and-write memory device. Some embodiments of the invention can use a mass-storage device (such as a magnetic or optical disk or flash memory) as a permanent storage device. Other embodiments can use a removable storage device (e.g., a floppy disk, a flash drive) as a permanent storage device.

Storage subsystem 1415 can store a touch gesture library 1415 that includes a number of system recognizable touch gestures 1432 on the GUI 1420, MIDI-controlled audio samples 1434 for storing data relating to music played on the virtual instruments, and virtual instrument data 1436 for storing information about each virtual instrument. Further detail regarding system architecture and auxiliary components thereof are not discussed in detail so as not to obfuscate the focus on the invention and would be understood by those of ordinary skill in the art.

Chord View Interface

Figure 1:
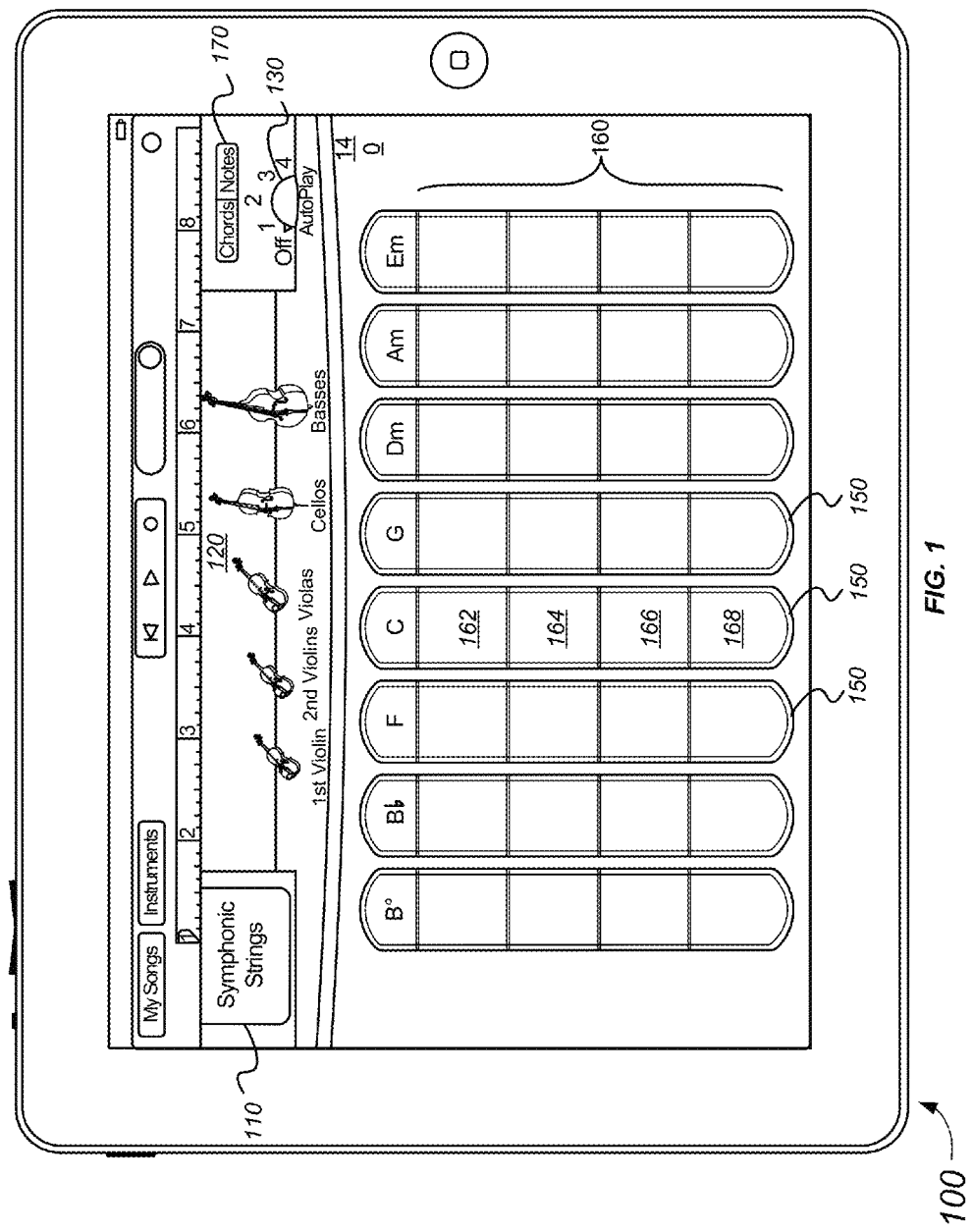
FIG. 1 shows a schematic illustration of a user interface for a virtual musical instrument, according to an embodiment of the invention.

FIG. 1 shows a schematic illustration of a user interface 100 for a virtual musical instrument, according to an embodiment of the invention. FIG. 1 shows the user interface displayed on a tablet computer such as the Apple iPad®; however the interface could be used on any touch screen or touch-sensitive computing device (e.g., smart phone, personal digital assistant, and the like). The interface 100 includes channel strip file (CST) sound browser 110, a virtual instrument selector (VIS) 120, an autoplay selector 130, a chord player region 140, and a chord/notes switch 170. Alternatively, other sound files, or "patches" can be used instead of, or in addition to, the CST files, which can be accessed with the sound browser 110.

The CST sound browser 110 can be configured to select a suite of virtual instruments, where each suite or ensemble is suited for a different musical preference. Selecting a given suite (e.g., Symphonic Strings, String Quartet, Baroque Strings, etc.) loads the appropriate CST and autoplay grooves specifically suited to the selected ensemble. For example, the Symphonic CST can include a first violin, a second violin, a viola, a cello, and a bass. In contrast, the String Quartet CST may include a first a second violin, a viola, and cello. Any number and configuration of virtual instruments can be grouped together in any preferred combination. In some embodiments, MIDI sequences can be used instead of, or in addition to, the autoplay grooves.

The interface 100 includes a number of chord touch regions (chord strips) 150, shown for example as a set of eight adjacent columns or strips. Each touch region 150 can correspond to a pre-defined chord (base chord) within one or more particular keys, with adjacent regions configured to correspond to different chords and progressions within the key or keys. For example, the key of C major includes the diatonic chords of C major (I), D minor (ii), E minor (iii), F major (IV), G major (V), A minor (vi), and B diminished (vii), otherwise known as the Tonic, Supertonic, Mediant, Subdominant, Dominant, Submediant, and Leading Tone chords. In the example shown in FIG. 1, an additional non-diatonic chord of B-flat major is included with the key of C major, and the chords are arranged sequentially in accordance with the circle of fifths. This arrangement allows a user to easily create sonically pleasing sequences by exploring adjacent touch regions. A user can touch or initiate gestures (e.g., swipe gestures) on the various touch regions 150 to create sounds that are related to the chord that is assigned to the particular touch region. The types of touches, sounds, and/or gestures associated with the touch regions and features therein are further described below. It should be noted that any set of pitches (collectively known as a chord) can be defined for any chord touch region and is not limited to the conventional harmony described in this particular example.

Each chord touch region is divided into a number of touch zones referred to collectively as touch zones 160. Referring to FIG. 1, each touch region 150 comprises four individual touch zones 162, 164, 166, 168. Each of the touch zones 160 can correspond to various harmonic voicings (e.g., chord inversions) of the base chord assigned to the touch region 150 that it belongs to. The chords assigned to each touch zone 160 can be associated with MIDI-controlled audio samples (e.g., signals, streams, etc.). Touching or initiating touch gestures on any touch zone 160 in a region 150 plays the chord audio sample assigned to that touch zone.

MIDI (Musical Instrument Digital Interface) is an industry-standard protocol defined in 1982 that enables electronic musical instruments, such as keyboard controllers, computers, and other electronic equipment, to communicate, control, and synchronize with each other. For example, MIDI can be used to trigger playback of an audio sample to create a sound. In other words, MIDI is an instruction communications protocol typically used in electronic musical instruments. It should be noted that the term "audio signal" can also include a MIDI-controlled audio sample or digital signal processor (DSP) generated audio stream. Other audio processing systems and protocols may be used as would be known by one of ordinary skill in the art.

Virtual Instrument Selection in Chords View

A user can select a virtual instrument via the VIS 120. In some cases, the virtual instruments can include one or more violins, violas, cellos, basses, or the like. When a user selects one or more instruments with the VIS 120, the system loads the appropriate patch files (e.g., CST files) for the selected instruments. In some embodiments, the VIS 120 displays up to 5 instruments or more, which when selected (e.g., by tapping) will either activate or deactivate a note being played by that particular instrument. For example, while performing gestural inputs on the touch zone region corresponding to a given chord sequence, a user may select a violin and a bass to play (i.e., output an audible musical output) the given chord sequence. During the input of gestures to create the chord sequence, the user can deselect the bass in real-time, leaving only the violin sample to be voiced during the chords sequence. Likewise, reselecting the bass thereafter will reintroduce the bass sample's voice into the chord sequence.

Grooves/Auto-Play Selection

In certain embodiments, the interface 110 includes various chord sequence auto-play features. An auto-play selector 130 is configured to loop one or more MIDI-controlled audio samples (e.g., audio signals/streams, audio loops, etc.) that include a number of predefined accompanying rhythms when selected by a user. In response to a user selection, a groove plays for the chord being touched by the user. In some embodiments, the groove rhythm latches or stops when the user touches the same chord region again. The groove rhythm can switch to a new chord by selecting a different touch region 150. The playback tempo can be locked during playback or manually adjustable as required. Variations of the auto-play grooves can be selected by one or more taps on the auto-play selector 130. In some cases, the auto-play grooves can be a MIDI sequence. Furthermore, the auto-play grooves (or MIDI sequences) will also correspond to the chord voicing selected for each touch zone 160.

Chord Inversions

In certain embodiments, each of the touch zones 160 of a touch region 150 can include various inversions of the base chord. For example, the top most touch zone 162 can correspond to a root position of the base chord, such as a C Major triad C-E-G with C in the bass. The next adjacent touch zone 164 can correspond to a first inversion of the base chord, or the C Major triad C-E-G with E in the bass. The following adjacent touch zone 166 can correspond to a second inversion of the base chord, or the C Major triad C-E-G with G in the bass. The next adjacent touch zone 168 can correspond to a third inversion of the base chord, or the C Major triad C-E-G with an additional $7^{th}$ in the bass (e.g., Cmaj7 with B in the bass or a C7 with a Bb in the bass). Alternatively, the touch zone 168 may include a $10^{th}$ in the bass, or E-C-G, where the E note is one octave higher than the E note in the first inversion E. Optional adaptations of the first, second, and third inversions can be utilized.

In some embodiments, each of the touch zones 160 of a touch region 150 can include various inversions of the base chord that are successively higher in relative pitch than the base chord. To illustrate, the top most touch zone 162 may correspond to a root position of the base chord, such as a C Major triad C-E-G with C in the bass. The next adjacent touch zone 164 may correspond to a first inversion of the base chord, or the C Major triad C-E-G with E in the bass, where at least one note of the chord (e.g., the top note) is higher than any note of the base chord. Similarly, the following touch zone 166 may include a second inversion of the base chord, where at least one note of the second inversion chord (e.g., the top note) is higher in pitch than any note of the base chord or first inversions. Finally, the last adjacent touch zone 168 can include a third inversion of the base chord, where at least one note of the third inversion chord is higher in pitch than any note of the base chord or first inversions. Configuring inversions in this manner can make cycling through the touch zones 160 sounds as if the relative pitch is moving from one register to a higher register.

Figure 16:
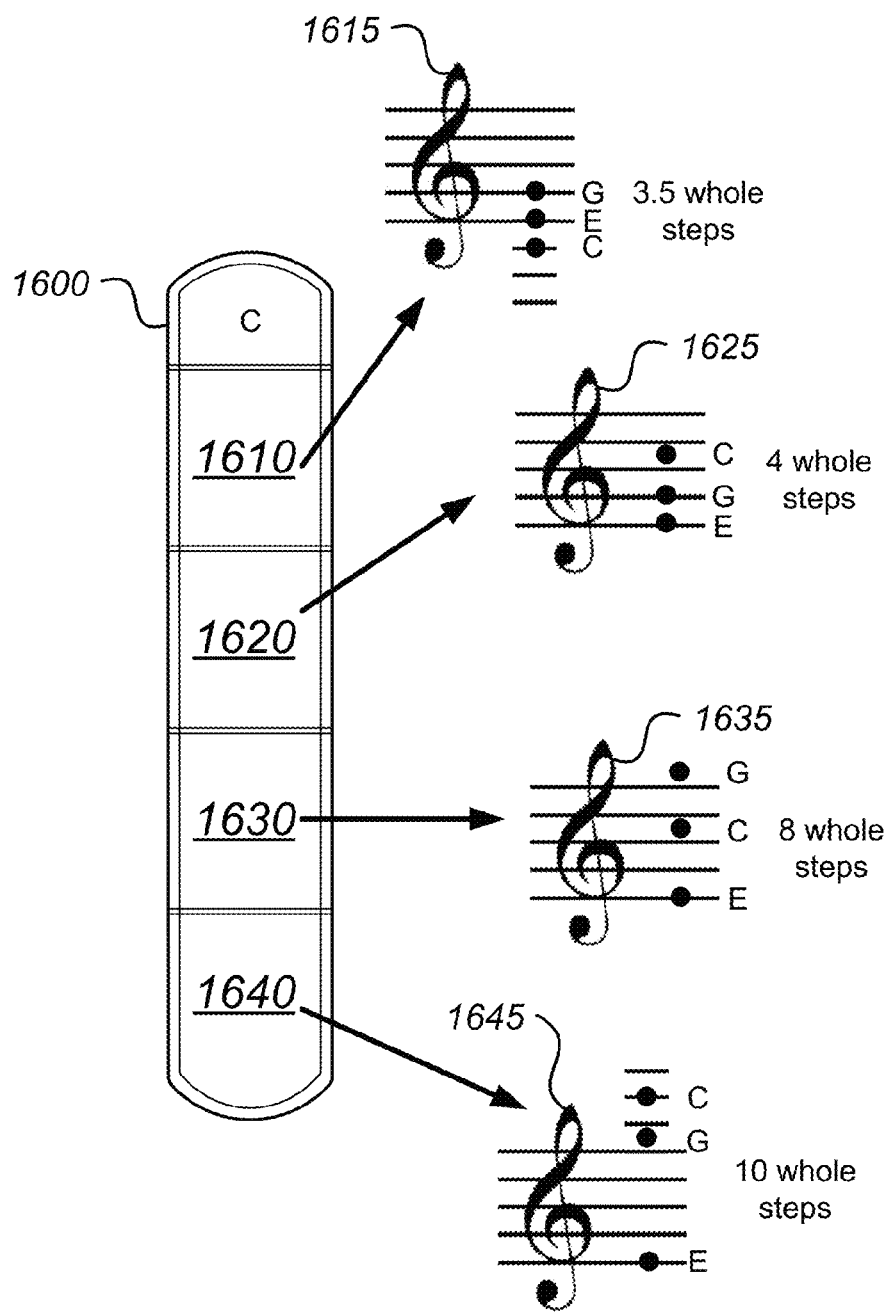
FIG. 16 illustrates a chord touch region including four touch zones with chord configurations having successively wider harmonic ranges, according to an embodiment of the invention.

In further embodiments, each of the touch zones 160 of a touch region 150 can include various chord voicings (i.e., the harmonic arrangement of notes) that have successively wider harmonic ranges. To illustrate, the top most touch zone 162 may correspond to the base chord with a certain harmonic range. For example, touch zone 162 can include a C triad comprising C-E-G where the G can be 3.5 whole steps from the root C. The next touch zone 162 may correspond to a chord voicing (e.g., inversion) with a wider harmonic range than the base chord of touch zone 162. For example, touch zone 162 can include a C triad comprising C-E-G with E in the bass and a C as the top note, where the top note C is 4 steps from the root E. The third and fourth touch zones 166 and 168 may follow in kind FIG. 16 illustrates a chord touch region 1600 including four touch zones with chord configurations having successively wider harmonic ranges, according to an embodiment of the invention. The chord touch region 1600 is assigned base chord C major and includes touch zones 1610, 1620, 1630, and 1640. In some embodiments, each touch zone has a different chord voicing of the base chord. As described above, the term "chord voicing" relates to a harmonic arrangement of notes. For example, a C major chord has the notes C-E-G. One chord configuration can have a C note as the bass note, while a second configuration may have the G note as the bass note. Each of these configurations can be referred to as a chord voicing. The distance between notes can be measured by half steps and whole steps, which can be thought of as musical units of measurement. Touch zone 1610 has a first voicing (i.e., harmonic arrangement) 1615 of a C major chord. The harmonic range of the first voicing is 3.5 whole steps. Touch zone 1620 has a second voicing 1625 of the C major chord with a wider harmonic range than the first voicing spanning 4 whole steps. Touch zone 1630 has a third voicing 1635 of the C major chord with a wider harmonic range than the second voicing spanning 8 whole steps. Touch zone 1640 has a fourth voicing 1645 of the C major chord with a wider harmonic range than the third voicing spanning 10 whole steps. Different chords, chord configurations, inversions, key signatures, and the like, can be customized to preference.

Figure 17:
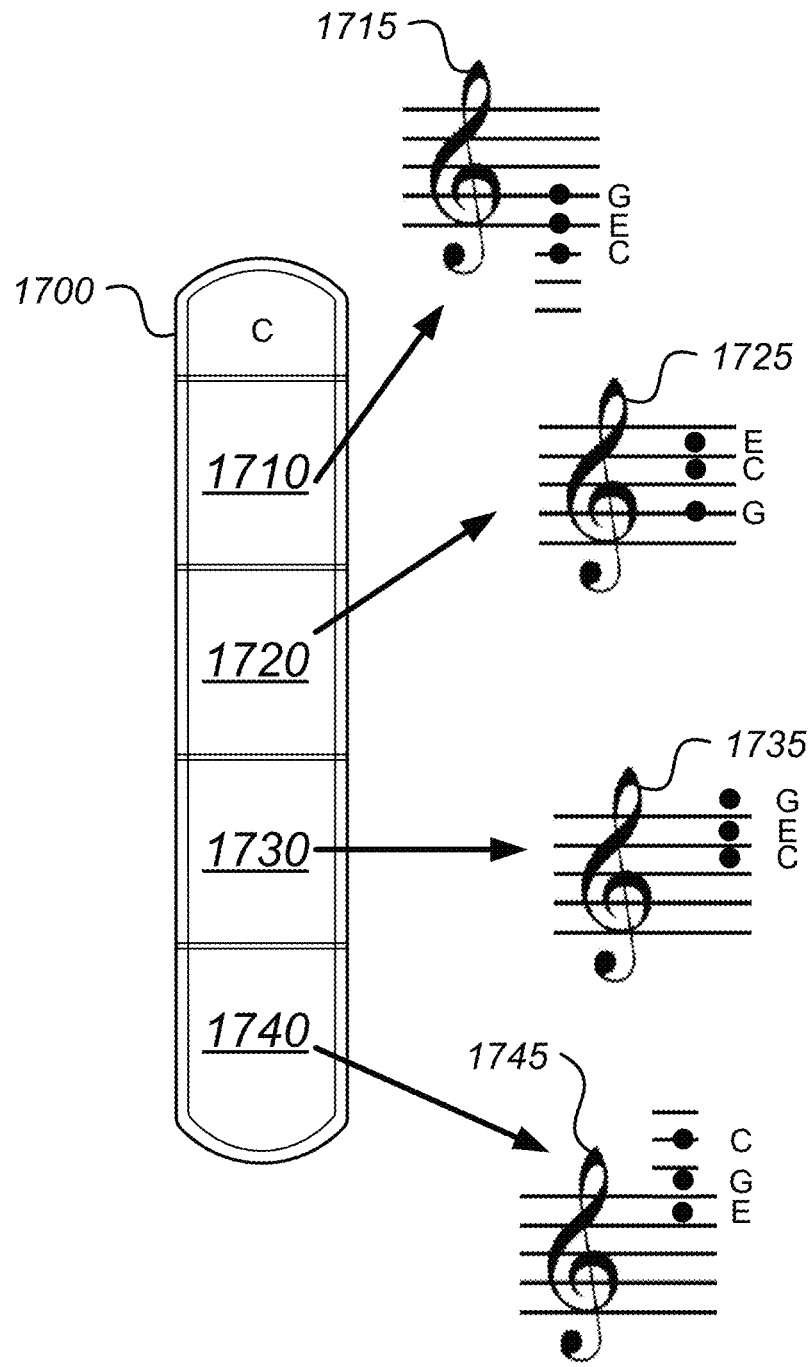
FIG. 17 illustrates a chord touch region including four touch zones with chord configurations having harmonic ranges successively higher in pitch, according to an embodiment of the invention.

FIG. 17 illustrates a chord touch region 1700 including four touch zones with chord configurations having harmonic ranges successively higher in pitch, according to an embodiment of the invention. The chord touch region 1700 is assigned base chord C major and includes touch zones 1710, 1720, 1730, and 1740. In some embodiments, each touch zone has a different chord voicing of the base chord. As described above, the term "chord voicing" relates to a harmonic arrangement of notes. Touch zone 1710 has a first voicing (i.e., harmonic arrangement) 1715 of a C major chord. Touch zone 1720 has a second voicing 1725 of the C major chord with a higher pitch than the first voicing. In other words, both the E and C notes in chord voicing ("chord") 1725 are higher in pitch than the highest note (G) of chord 1715. In some cases, the audible effect of only one note in a first chord being higher in pitch than all notes of a second chord will make the first chord sound higher in pitch overall. Referring back to FIG. 17, touch zone 1730 has a third voicing 1735 of the C major chord with a higher pitch than the first (1715) and second voicings (1725). For example, the G note is higher in pitch than any of the notes of chord 1715 and 1725. Touch zone 1740 has a fourth voicing 1745 of the C major chord with a higher pitch than the first (1715), second voicings (1725), and third voicings (1735). For example, the C note is higher in pitch than any of the notes of chords (i.e., voicings) 1715, 1725, and 1735. It should be noted that other chords, chord configurations, inversions, key signatures, and the like, can be customized to preference.

In some embodiments, touching or articulating gestures up or down through the touch zones 160 may cause the chord voicing to change by the minimum number of notes needed to switch to the nearest inversion from the chord voicing that was being played prior to the touch or gesture articulation. For example, if touch zone 162 includes a C major triad C-E-G with C in the bass, and touch zone 164 includes a C major triad E-G-C with an E in the bass, the E and G notes will not change between chords. Changing the minimum amount of notes in a chord change can result in a smoother or more harmonically pleasing sound, as further illustrated in FIG. 18.

FIG. 18 illustrates a chord touch region including four touch zones with chord configurations that change by a minimum number of notes between chord inversions, according to an embodiment of the invention. The chord touch region 1800 is assigned base chord C major and includes touch zones 1810, 1820, 1830, and 1840. Touch zone 1810 includes a C major triad C-E-G with C in the bass, and touch zone 1820 includes a C major triad E-G-C with an E in the bass. It should be noted that the E and G notes do not change during the chord change 1815. As described above, changes between chord inversions (e.g., 1810 to 1820) result in a change in the minimum amount of notes needed for the chord change. In some cases, this can be a dynamic process such that different chord voicings may be assigned to the same touch zone depending on the arrangement of the previous chord voicing. For example, the C chord inversion assigned to 1810 may produce (e.g., play back) a chord voicing of a different arrangement when approached from touch zone 1820 rather than from touch zone 1830 because the arrangement of the notes and the minimum changes required for the chord change is different. A first inversion C chord with an E in the bass may only require one note to shift positions when switching to a C chord with a C root note (e.g., C note moves to the bass position and other notes do not change). However, a second inversion chord with a G in the bass may require multiple notes to shift positions when switching to a C chord with a C root note. It should be noted that different chords, chord configurations, inversions, key signatures, and the like, can be customized to preference.

In other embodiments, touching or articulating gestures between chord regions may cause chord voicings to change by the minimum number of notes needed to switch between chords. For example, if one touch region includes a C major triad C-E-G as a base chord, and a second touch region includes an E minor triad E-G-B, the E and G notes does not change between the chord change. Changing the minimum number of notes between chord changes can result in more harmonically pleasing chord progressions.

FIG. 19 illustrates a chord touch region including four touch zones with chord configurations that change by a minimum number of notes between chords, according to an embodiment of the invention. The chord touch region 1900 is assigned base chord C major and includes touch zones 1910, 1920, 1930, and 1940. The chord touch region 1950 is assigned base chord E minor and includes touch zones 1960, 1970, 1980, and 1990. Touch zone 1910 includes a C major triad C-E-G with C in the bass, and touch zone 1960 includes a E minor triad E-G-B with an E in the bass. As described above, changes between chords result in a change in the minimum amount of notes needed for the chord change. In this case, the E and G notes do not change position during the chord change 1935. In some cases, this can be a dynamic process such that different chord voicings may be assigned to the same touch zone depending on the arrangement of the previous chord voicing. For example, the E minor chord inversion assigned to 1970 may produce (e.g., play back) a chord voicing of a different when approached from touch zone 1910 rather than from touch zone 1920 because the arrangement of the notes and the minimum changes required for the chord change may be different. A described above, changing from a C chord with a C note in the bass to an E minor chord with an E in the bass results in only one note change (i.e., C changes to B), while both the E and G notes do not change. However, changing from a second inversion C chord (1930) with a G in the bass to an Em chord with E in the bass position may require multiple notes to shift position. It should be noted that different chords, chord configurations, inversions, key signatures, and the like, can be customized to preference.

Touch Gesture Articulations in Chord View

Each touch zone 160 in each touch region 150 is configured to detect one or more of a number of different touch gestural articulations, according to certain embodiments. The touch gesture articulations can include a legato articulation, a pizzicato articulation, and a staccato articulation. Each of the gesture articulations triggers playback (i.e., output) of a corresponding audio signal that simulates the selected articulation. In some cases, the audio signal can be a MIDI-controlled audio sample or a DSP generated audio stream. It should be noted that the term "audio signal" can also any suitable means of playing an audio signal. Playing an audio signal can include playback on an electro-acoustic transducer (e.g., a speaker), decoding the audio signal, saving in memory, coupling to other systems or devices, or other non-audible output scenarios that would be appreciated by one of ordinary skill in the art with the benefit of this disclosure. It should be noted that although three different gesture articulations are described, any number and/or type of gesture articulations (e.g., double taps, dual finger swipes, palm, circular motions, polygonal outline motions, multi-finger gestures, etc.) may be used in any combination or set as required.

Figure 2:
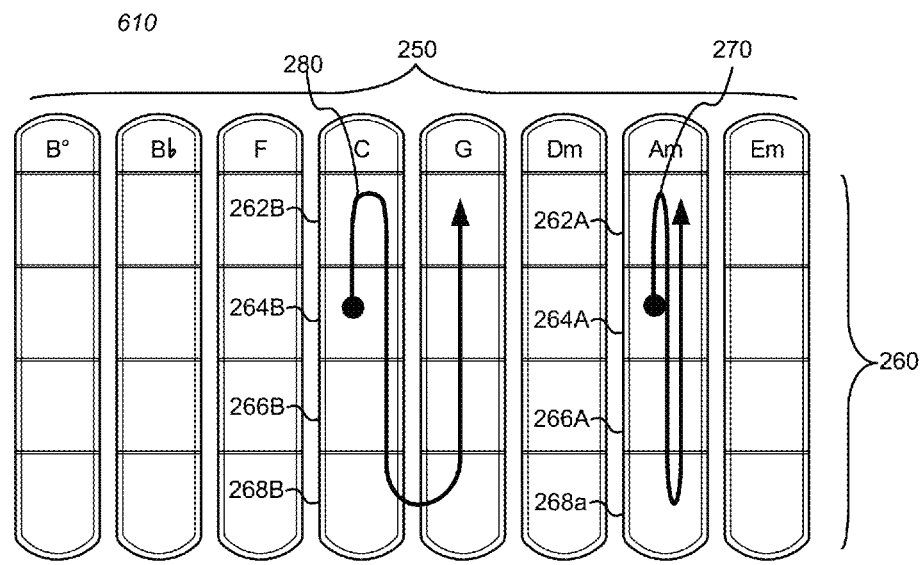
FIG. 2 illustrates a plurality of gestural legato articulations over a plurality of musically defined touch regions, according to an embodiment of the invention.

FIG. 2 illustrates a plurality of legato articulations over a plurality of touch regions 250, according to an embodiment of the invention. The touch regions 250 and touch zones 260 are similar to those which are described in FIG. 1. The legato articulation is initiated by a tap-to-swipe gesture on one of the touch zones 260. In certain cases, the initial tap should be longer than a predetermined period of time before initiating the swipe gesture to differentiate the legato articulation from the staccato (i.e., tap gesture shorter than the predetermined time) or pizzicato articulation (i.e., swipe gesture with no initial tap period) further described below. A continuous up-and-down swiping motion of the legato articulation mimics the motion of a bow played across a set of strings on a stringed instrument (e.g., violin, cello, bass). Similarly, the corresponding audio signal (e.g., MIDI-controlled audio sample) plays the sound of a bowing action across a set of strings on a stringed instrument. In FIG. 2, gesture 270 illustrates a touch-and-swipe legato gesture on touch zone 264A. The initial touch point on the touch zone 264A determines the inversion of the base chord that is played. In this example, the legato articulation 270 plays a first inversion legato bowing sound in A minor. Gesture 280 illustrates a touch-and-continuous swipe legato gesture at touch zone 264B. In this example, the legato articulation 280 plays a first inversion legato bowing sound in C major and continues to do so even if the swiping motion moves outside of the associated touch region. In some embodiments, as long as the finger is not removed from the touch surface of the interface 100, the bowing action will continue to play the same inversion of the initial touch point regardless of the subsequent position of the finger on the interface. In some cases, changing base chords or chord inversions occurs by starting a new legato gesture articulation in a different zone by lifting the finger and placing it in the desired chord/inversion region. Alternatively, introducing a second finger in a different touch zone can begin a new legato gesture articulation. In other words, the interface recognizes the second touch input as a new legato gestural articulation and ignores the first finger. Furthermore, the speed or velocity of the legato articulation can determine various expression values of the corresponding audio signal, such as a volume of playback. Other expression values can include pitch, duration, equalization, filtering (e.g., high pass, low pass, band pass, notch filters, etc.), pan, effects (e.g., reverb, chorus, delay, distortion, presence, etc.), or any other parameters that can be modulated as described. In some embodiments, the direction and/or acceleration of the gesture articulation can also be used to modulate one or more expression values (e.g., variable of playback).

In certain embodiments, multi-finger gestures can allow the user to quickly transition from one chord zone to another. For example, if a second touch point is detected within the chord interface while a bowing gesture is active in another chord touch zone, the chord can quickly change to the new chord touch zone. Furthermore, if the second touch is a bow swipe (e.g., legato articulation), the expression (e.g., a volume) value generated from the first touch transfers to the new expression value for the second touch using the same swipe gesture ballistics that were present immediately prior to the change. To illustrate, if two consecutive swipes are occurring at substantially the same swipe gesture speed, then there should be substantially no change in expression value (volume) when the chord transition occurs. In contrast, if the second gesture occurs at a different speed than the first gesture, then the expression value (volume) transitions from the first expression value to the second expression value in a smooth and musical way, as further described below.

Figure 3:
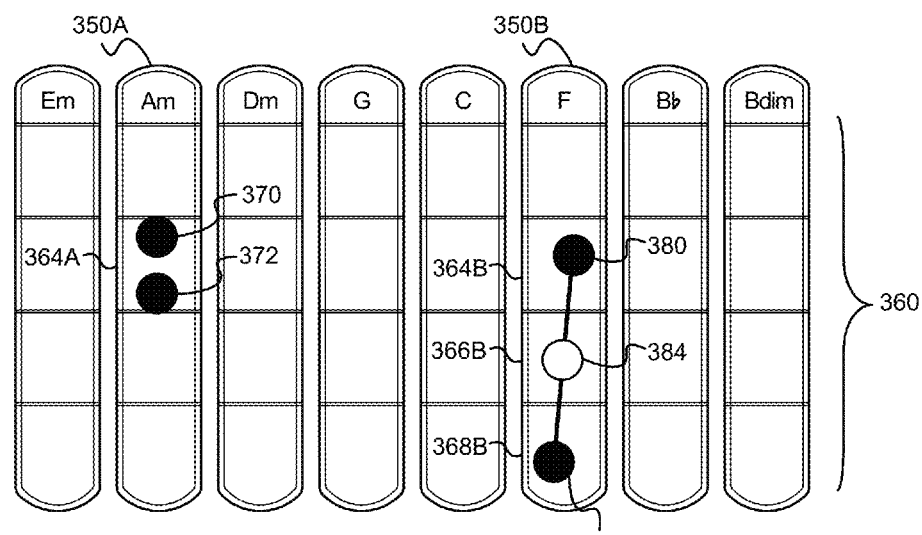
FIG. 3 illustrates a two-finger auto-legato gestural articulation over a plurality of musically defined touch regions, according to an embodiment of the invention.

FIG. 3 illustrates a two-finger auto-legato gesture articulation, according to an embodiment of the invention. FIG. 3 depicts a first touch 370 (tap-and-hold) and simultaneous second touch 372 (tap-and-hold) at touch zone 364A of the touch region 350A. Tapping and holding two fingers in a touch zone auto-plays a legato chord sound. In this example, the auto legato gesture articulation plays the inversion associated with touch zone 364A of touch region 350A (A minor). Two finger auto-legato gestures do not require a swipe gesture and can be configured to play instantly. In some cases, the volume of the auto-legato articulation is fixed and can be based on the initial velocity of the two finger-tap gesture. The initial velocity can be determined, for example, by an accelerometer. In certain cases where multiple touch zones are simultaneously touched, a resultant touch location can be selected as the initial touch zone. For example, a first touch 380 at touch zone 364B and a simultaneous second touch 382 at touch zone 368B results in an effective two finger-tap gesture 384 at touch zone 366B of touch region 350B. The note characteristics of the two-finger auto-legato touch gestures typically have relatively short attack times to support rapid transitions to different base chords or inversions.

Figure 4:
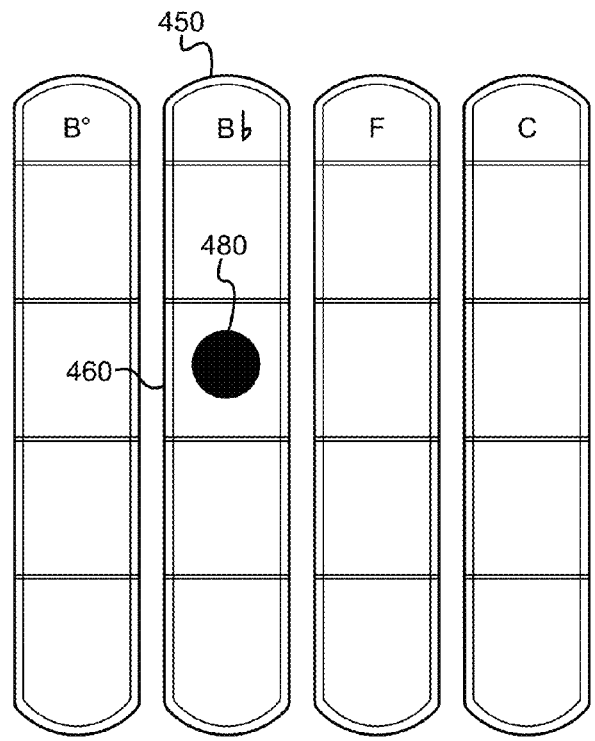
FIG. 4 illustrates a pizzicato gestural articulation in a touch region of a touch-sensitive musical interface, according to an embodiment of the invention.

FIG. 4 illustrates a pizzicato gesture articulation in a touch region 450 of a touch-sensitive interface, according to an embodiment of the invention. The pizzicato gesture articulation can be initiated by a quick tap gesture 480 including an initial tap in one of the plurality of separate touch zones 460 and a release prior to a predetermined period. The pizzicato gestural articulation triggers the playback of a second corresponding MIDI-controlled audio sample that simulates the sound of a plucking action on a stringed instrument. In one embodiment, the predetermined period is any suitably short period of time (e.g., less than 200 ms) that would be appreciated by one of ordinary skill in the art with the benefit of this disclosure. In some embodiments, if the touch is held longer than the predetermined period, the removal of the finger will not trigger the audio sample. Furthermore, the speed or velocity of the pizzicato gestural articulation (e.g., the speed at which the initial tap on the interface is received) can determine various expression values of the corresponding audio sample, such as a volume of playback. Other expression values can include pitch, duration, equalization, filtering (e.g., high pass, low pass, band pass, notch filters, etc.), pan, effects (e.g., reverb, chorus, delay, distortion, presence, etc.), or any other parameters that can be modulated as described. The initial velocity of the initial tap may be determined by an accelerometer.

Figure 5:
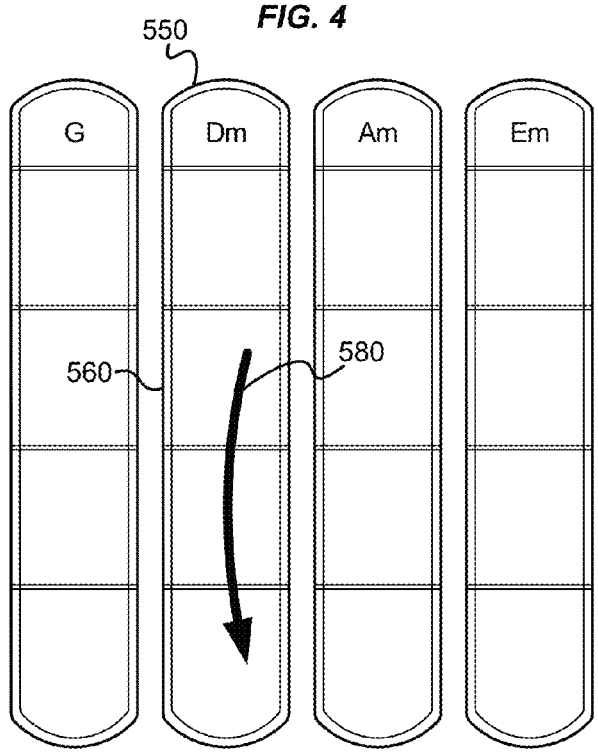
FIG. 5 illustrates a staccato gesture articulation in a touch region of a touch-sensitive musical interface, according to an embodiment of the invention.

FIG. 5 illustrates a staccato gesture articulation 580 in a touch region 550 of a touch-sensitive interface, according to an embodiment of the invention. The staccato gestural articulation is initiated by an in-motion swipe gesture beginning upon contact with a touch zone 560. In other words, a quick swipe motion is initiated with no pause (e.g., tap) before beginning the swipe, where the swipe begins upon contact with the given touch zone 560. The staccato gesture articulation triggers playback of a corresponding MIDI controlled audio signal that simulates the sound of a short burst of a bowing action on a stringed instrument. The speed or velocity of the staccato articulation can determine various expression values of the corresponding audio sample, such as a volume of playback. Other expression values can include pitch, duration, equalization, filtering (e.g., high pass, low pass, band pass, notch filters, etc.), pan, effects (e.g., reverb, chorus, delay, distortion, presence, etc.), or any other parameters that can be modulated as described.

Figure 6:
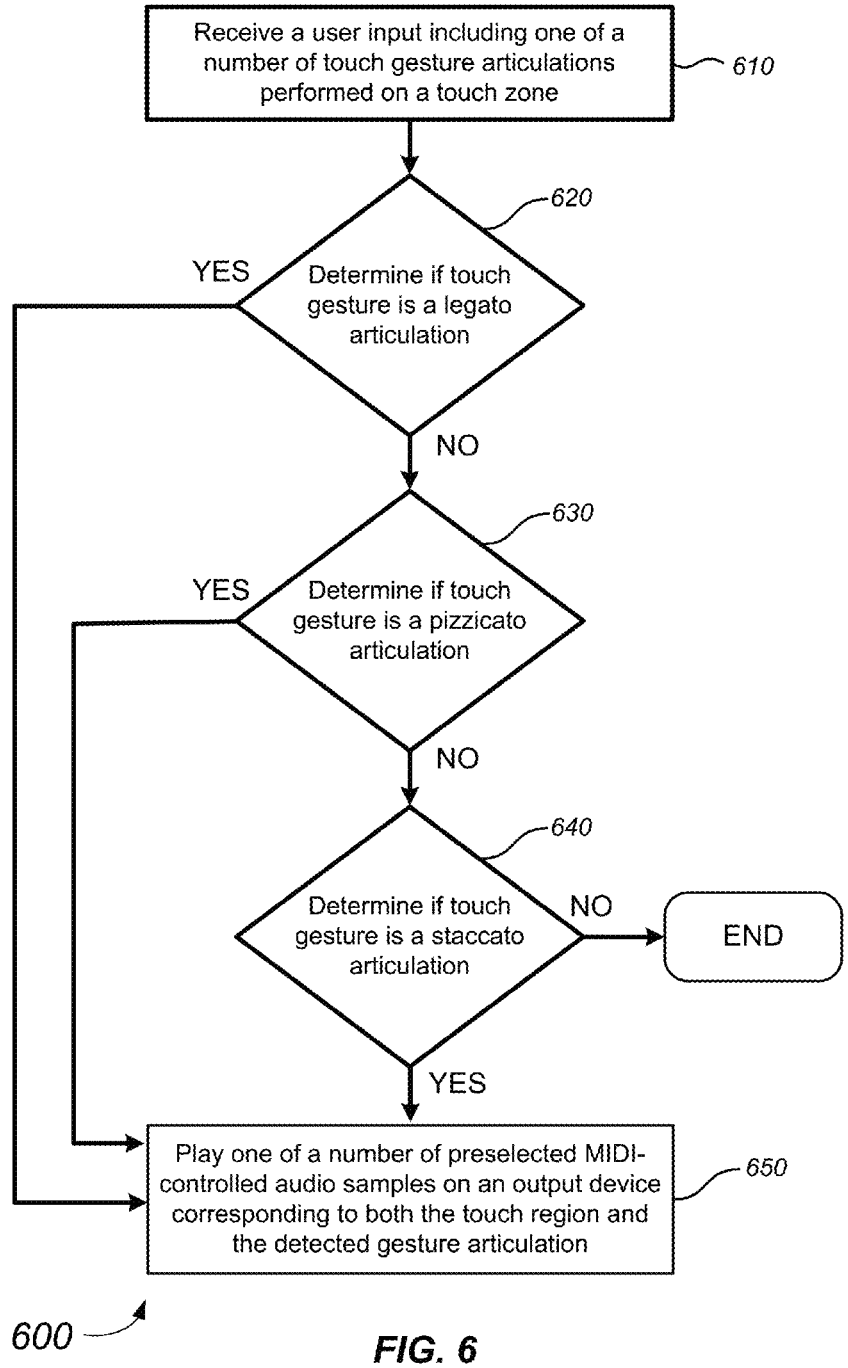
FIG. 6 is a simplified flow diagram illustrating aspects of a method of determining a characteristic of a note outputted by a virtual instrument, according to an embodiment of the invention.

FIG. 6 is a simplified flow diagram illustrating aspects of a method 600 of determining a characteristic of a note played on a virtual instrument, according to an embodiment of the invention. The method 600 is performed by processing logic that may comprise hardware (e.g., circuitry, dedicate logic, etc.), software (which as is run on a general purpose computing system or a dedicated machine), firmware (embedded software), or any combination thereof. In one embodiment, the method 600 is performed by the processor unit 1410 of FIG. 14.

Referring to FIG. 6, the method 600 begins with the receiving a user input on a touch zone of a touch sensitive interface (610). The user input can include one of a number of touch gesture articulations. At 620, the processor determines if the touch gesture is a legato articulation. A legato articulation includes a touch-to-swipe gesture that imitates the motion of a bow played across a set of strings on a stringed instrument (e.g., violin, cello, bass). In certain cases, the initial touch should be longer than a predetermined period of time before initiating the swipe gesture to differentiate the legato articulation from the staccato (i.e., tap gesture shorter than the predetermined time) or pizzicato articulation (i.e., swipe gesture with no initial tap period). If the processor determines that the user input is a legato articulation, the processor plays (or outputs) one of a number of preselected audio signals (e.g., MIDI controlled audio samples, DSP generated audio streams, etc.) on an output device (e.g., speaker, headphones, or the like) corresponding to both the touch region selected (e.g., chord inversions) and the legato articulation (650). If the processor determines that the user input is not a legato articulation, the method proceeds to 630.

At 630, the processor determines if the touch gesture is a pizzicato articulation. A pizzicato gesture articulation can be initiated by a quick tap gesture including an initial tap in a touch zone and a release prior to a predetermined period. The pizzicato articulation imitates the sound of a plucking action on a stringed instrument. If the processor determines that the user input is a pizzicato articulation, the processor plays one of a number of preselected audio signals on an output device corresponding to both the touch region selected (e.g., chord inversions) and the pizzicato articulation (650). If the processor determines that the user input is not a pizzicato articulation, the method proceeds to 640.

At 640, the processor determines if the touch gesture is a staccato articulation. The staccato articulation can be initiated by an in-motion swipe gesture (i.e., no pause or tap) beginning upon contact with a touch zone. The staccato gesture articulation imitates the sound of a short burst of a bowing action on a stringed instrument. If the processor determines that the user input is a staccato articulation, the processor plays one of a number of preselected audio signals (e.g., MIDI-controlled audio samples) on an output device corresponding to both the touch region selected (e.g., chord inversions) and the staccato articulation (650). If the processor determines that the user input is not a staccato articulation, the method ends.

Differentiation between each of the legato and staccato gestural articulations is based on detecting a time interval associated with the initial touch which is followed by a consecutive (i.e., without a lift off of the touch) swiping gesture having a particular initial speed. A legato articulation is detected based on the detecting of an initial touch lasting a given time interval, which is followed by a swiping motion of any speed. The staccato gestural articulation is based on detecting that the initial touch is less than the given time interval.

It should be appreciated that the specific steps illustrated in FIG. 6 provides a particular method of determining a characteristic of a note played on a virtual instrument, according to an embodiment of the present invention. Other sequences of steps may also be performed according to alternative embodiments. In certain embodiments, the method 600 may perform the individual steps in a different order, at the same time, or any other sequence for a particular application. For example, the pizzicato gesture may be determined before the legato gesture. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variation, modification, and alternatives of the method.

Notes View Interface

Figure 7:
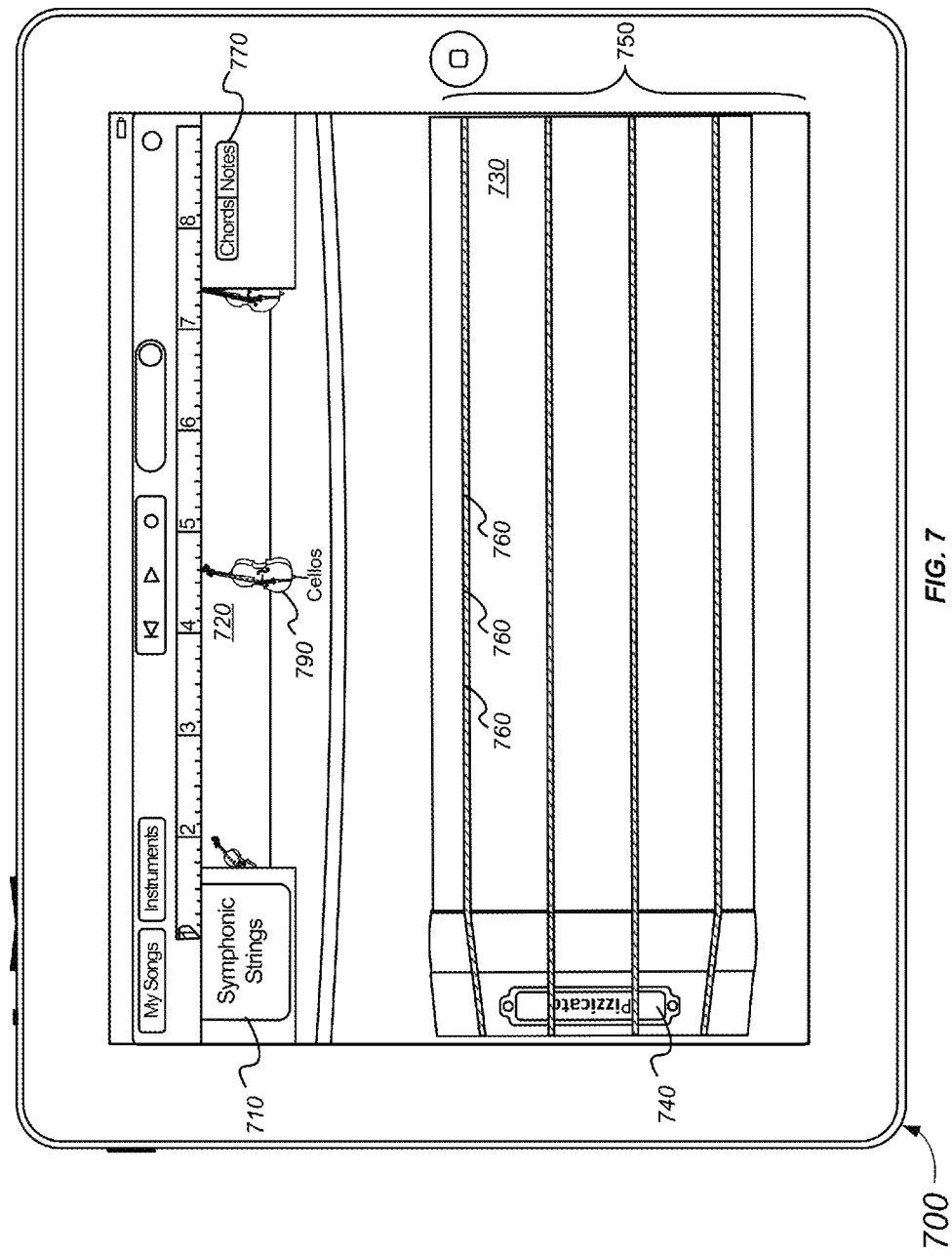
FIG. 7 shows an illustration of a user interface for a virtual musical instrument, according to an embodiment of the invention.

FIG. 7 shows an illustration of a user interface 700 for a virtual musical instrument, according to an embodiment of the invention. FIG. 7 shows the user interface displayed on a tablet computer such as the Apple iPad®; however the interface could be used on any touch screen or touch-sensitive computing device (e.g., smart phone, personal digital assistant, and the like). The interface 700 includes CST sound browser 710, a virtual instrument selector (VIS) 720, a violin neck and headstock 730, an Arco/Pizz badge 740, and a chords/notes switch 770. The violin neck 730 includes a plurality of virtual strings 750, where each string corresponds to a base note (open string) and is divided into a plurality of touch zones 760 with notes corresponding to a predetermined scale (e.g., chromatic, pentatonic, harmonic minor, etc.). Each of the notes can correspond to one or more MIDI-controlled audio samples associated with the selected virtual instrument, the type of articulation performed, expression value, or any combination thereof, as further described below.

The chords/notes switch 770 functions as a virtual toggle switch configured to switch between the chords view (e.g., FIG. 1) and the notes view (e.g., FIG. 7). The CST sound browser 710 can be configured to select a suite of virtual instruments and their associated audio signals (e.g., MIDI-controlled audio sample, DSP generated audio stream, etc.), where each suite or ensemble is suited for a different musical preference. Selecting a given suite (e.g., Symphonic Strings, String Quartet, Baroque Strings, etc.) loads the appropriate CST files specifically suited to the selected ensemble. For example, the Symphonic CST can include a first violin, a second violin, a viola, a cello, and a bass. In contrast, the String Quartet CST may include a first a second violin, a viola, and cello. Any number of virtual instruments can be grouped together in any preferred configuration.

Virtual Instrument Selection in Notes View

The VIS 720 is used to select the virtual instruments desired by the user. In some cases, the virtual instruments can include one or more violins, violas, cellos, basses, or the like.

When a user selects one or more instruments with the VIS 720, the system will load the appropriate audio samples for the selected instruments. In some embodiments, one instrument can be played at a time in notes view. For example, a user may select a cello, thereby deactivating any basses, violins, and/or violas in that particular suite of virtual instruments. As shown in FIG. 7, only one virtual instrument is fully shown at one time to clearly identify the active virtual instrument. In alternative embodiments, multiple instruments can be selected for simultaneous playback in notes view. For example, the VIS 720 ("part selector") can display up to 5 instruments or more, which when selected (e.g., by tapping) either activates or deactivates a note being played by the selected instruments.

In certain embodiments, the VIS 720 displays a number of virtual instruments (e.g., violins, violas, cellos, and basses) that are arranged on a virtual scrollable area on the user interface 700. A swipe gesture on the virtual scrollable area can cause the area to slide in a direction relative to the swipe gesture, thereby changing an orientation of the virtual scrollable area. For example, as a user performs a swipe gesture on the VIS 720 from right-to-left, the virtual instruments cycle through or moves across the VIS 720 display area from right-to-left at a speed proportional to the speed of the swipe gesture. Selecting a virtual instrument can be based on the orientation of the virtual scrollable area. In addition, the virtual scrollable area can have a selection location 790 to select the virtual instrument located in the selection location 790. In some cases, the selection location is located in the center position of the VIS 720. Referring to FIG. 7, the cello is currently selected because it is positioned in the selection location 790. It should be noted that the configuration of the VIS 720 can be customized to a user preference. For example, all virtual instruments may be visible on the VIS 720 or only a subset at any given time. The virtual scrollable area may slide linearly, or on a virtual axis of a suitable radius such that the virtual instruments appear to "rotate" into position at the selection location 790. In some embodiments, a selection may be made automatically as a virtual instrument slides into the selection location 790, or a selection may require an additional manual tap on the virtual instrument to confirm selection.

Figure 20:
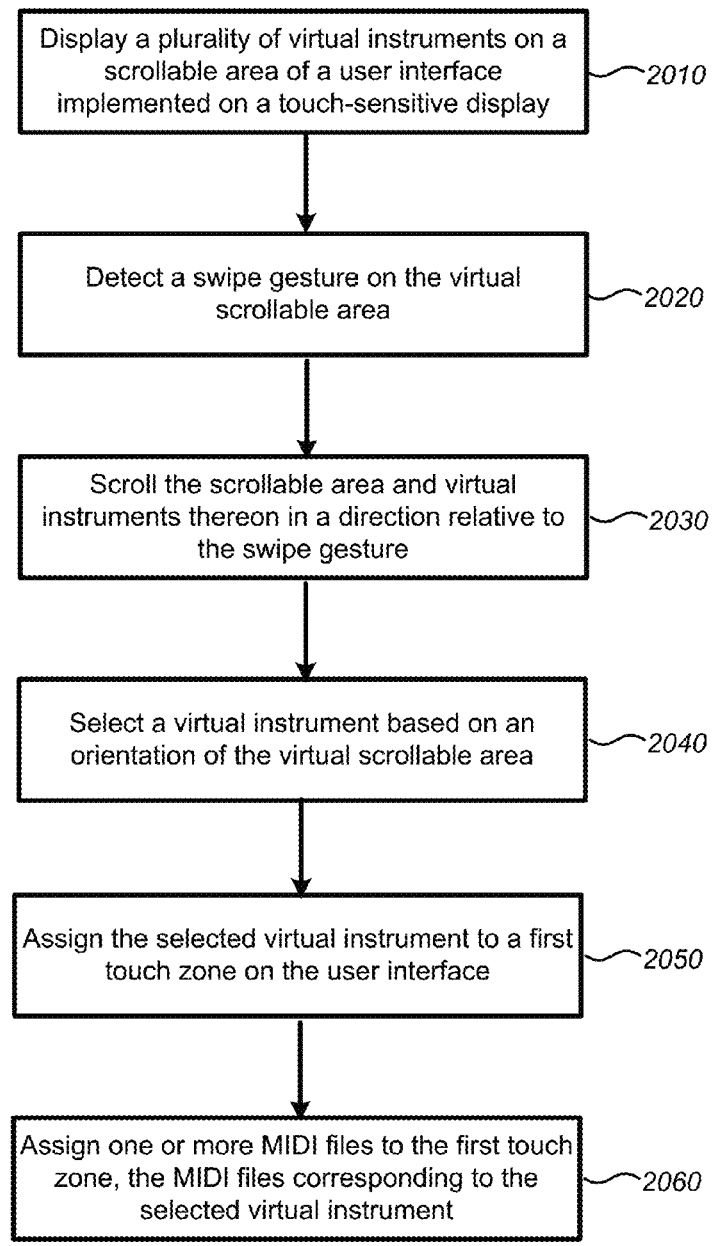
FIG. 20 is a simplified flow diagram illustrating aspects of a method of selecting a virtual instrument on a user interface, according to an embodiment of the invention.

FIG. 20 is a simplified flow diagram illustrating aspects of a method 2000 of selecting a virtual instrument on a user interface, according to an embodiment of the invention. The method 2000 is performed by processing logic that may comprise hardware (e.g., circuitry, dedicate logic, etc.), software (which as is run on a general purpose computing system or a dedicated machine), firmware (embedded software), or any combination thereof. In one embodiment, the method 2000 is performed by the processor unit 1410 of FIG. 14.

Referring to FIG. 20, the method 2000 begins with displaying a plurality of virtual instruments on a scrollable area of a user interface (2010). In some cases, the user interface can be touch-sensitive, where the scrollable area is directly accessible by user touch (e.g., finger, stylus, etc.). In non-touch sensitive embodiments, the scrollable area may be accessible via input device (e.g., mouse, keyboard, etc.). At 2020, the user interface (by way of a processor device) detects a swipe gesture on the virtual scrollable area. In response to the swipe gesture, the user interface scrolls the scrollable area (e.g., VIS 720) and virtual instruments (e.g., virtual violin, viola, cello, bass, etc.) thereon in a direction relative to the swipe gesture (2030). In certain embodiments, as a user performs a swipe gesture on the scrollable area (e.g., VIS 720) from right-to-left, the virtual instruments cycle through or moves across the VIS 720 display area from right-to-left at a speed proportional to the speed of the swipe gesture. The user interface then selects a virtual instrument based on an orientation of the virtual scrollable area (2040). The virtual scrollable area can have a selection location configured within the scrollable area to identify the virtual instrument to be selected. For example, if the user interface scrolls through the virtual instruments in response to a swipe gesture and a violin stops in the selection location, then the violin will be selected. In some cases, the selection location is located in the center position of the scrollable area. The selection location can optionally be configured in any suitable position on the scrollable area. At 2050, the user interface assigns the selected virtual instrument to a first touch zone on the user interface. The user interface further assign one or more MIDI-controlled audio samples to the first touch zone where the audio samples correspond to the selected virtual instrument (2060)

It should be appreciated that the specific steps illustrated in FIG. 20 provides a particular method of selecting a virtual instrument on a user interface, according to an embodiment of the present invention. Other sequences of steps may also be performed according to alternative embodiments. In certain embodiments, the method 2000 may perform the individual steps in a different order, at the same time, or any other sequence for a particular application. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize and appreciate many variation, modification, and alternatives of the method.

Touch Gesture Articulation in Notes View

Each of the virtual strings 750 of a user interface 700 is configured to detect one or more of a plurality of different touch gesture articulations, according to certain embodiments. The touch gesture articulations can include a legato articulation, a pizzicato articulation, and a staccato articulation. Each of the gesture articulations triggers playback of a corresponding MIDI-controlled audio sample (or DSP generated audio stream) that simulates the selected articulation. As described above, the legato articulation mimics a bowing action across a set of strings, the pizzicato articulation mimics a sound of plucking a stringed instrument, and a staccato articulation mimics a sound of a short burst of a bowing action on a stringed instrument.

In some embodiments, the Arco|Pizz (i.e., bow/pizzicato) badge 740 is displayed at the far left of the notes view inside the headstock graphic. The arco/pizz badge ("button badge") 740 is a toggle switch configured to select between a first mode (auto-bow mode) and second mode (arco|pizz mode) of operation. In some embodiments, the button badge 740 is a temporary switch where the badge remains in the second mode of operation as long as a user is pressing the badge 740. In other embodiments, the badge 740 toggles between the two modes of operation and remains in the selected mode of operation until the badge 740 is depressed again.

In the auto-bow mode of operation (i.e., first mode), touching any point on one of the strings 750 can produce a corresponding legato note with a short attack. The legato note plays continuously as long as the touch object (e.g., finger, stylus, or any input device) remains on the strings. In certain embodiments, the first mode of operation interprets any gesture (e.g., tap, swipe, etc.) as a touch and plays the corresponding legato note, regardless of the initiating gesture.

Figure 8:
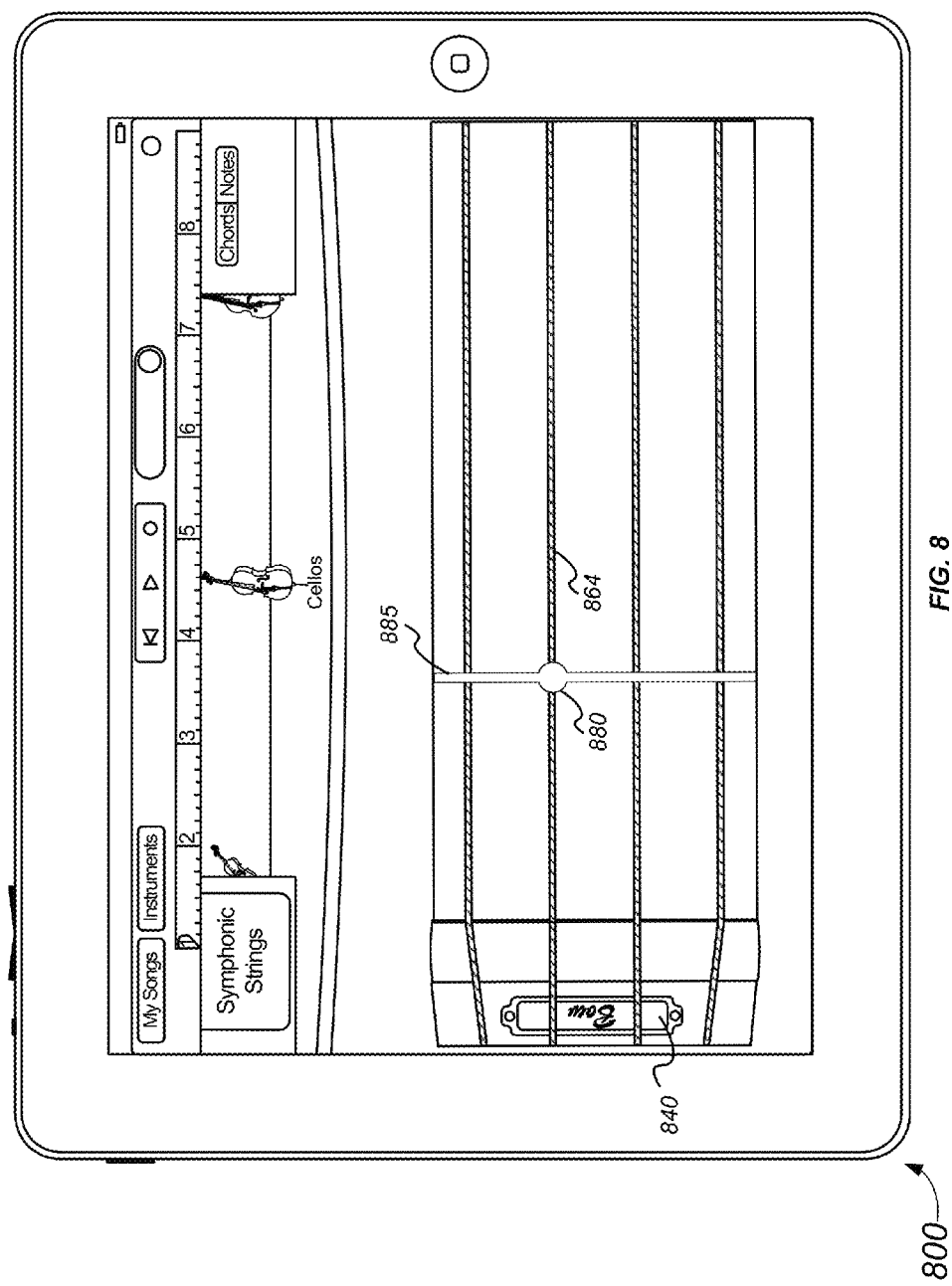
FIG. 8 illustrates a legato gestural articulation on a touch region of a virtual musical instrument interface, according to an embodiment of the invention.

FIG. 8 illustrates a legato articulation on the notes view interface 800, according to an embodiment of the invention. When a user presses the button badge 840 and holds a point 880 on a string 864, a graphic indicator 885 is shown prompting the user to perform an up and down swiping (bowing) motion. In some cases, the graphic indicator 885 is a note highlight radiating from the initial touch point 880 to indicate the bow motion gesture to the user. The interface 800 typically displays the graphic indicator 885 when the button badge 840 is active, a touch is detected on a string, and the touch is determined not to be a pizzicato tap (i.e., the tap is longer than a predetermined period). As the user swipes up and down, the instrument plays a legato note based on the start position of the bowing action. While the button badge 840 is held, the user can tap any string position for a corresponding pizzicato note. In certain embodiments, only one instrument can be played at a time (violin, viola, cello, bass) in the notes view. In alternative embodiments, multiple instruments can be selected in the notes view for simultaneous play.

With the button badge 840 pressed, both legato and staccato articulations can be performed in a similar way as in the chords view. The speed or velocity of the staccato articulation (i.e., how hard the note is tapped) can determine various expression values of the corresponding MIDI-controlled audio sample, such as a playback volume. A faster legato articulation can create a louder volume and slower legato articulations may create a softer volume. The notes view can be further configured to support multi-finger detection (e.g., double stop chords) with staccato, legato, and pizzicato articulations. In certain aspects, the instrument strings in the notes view are tuned to the standard open strings for the selected virtual instrument. In some embodiments, note sliding or pitch bending can be supported when the button badge 840 is not active. An accelerometer can optionally be configured to determine the velocity (i.e., how hard the note is touched) of any articulations in notes view.

Velocity Sample Cross Fades

According to certain embodiments, the virtual instruments described herein utilize a cross-fade of two channels comprising a loud sample and a soft sample to create notes of varying velocities (i.e., amplitudes, volume, etc.). Lower velocity audio signals created by the virtual instruments may have a higher weighted value for the soft sample, and higher velocity audio signals may have a higher weighted value for the loud sample. The resultant composite sample creates a more realistic sounding virtual instrument that more accurately reproduces the various aural characteristics and harmonic structures of notes played at varying degrees of amplitude.

Figure 9:
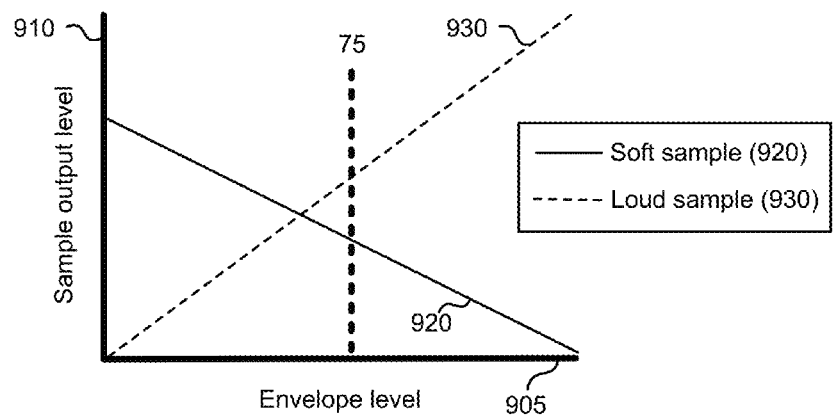
FIG. 9 depicts a graph illustrating the cross-fading of two samples of a virtual instrument, according to an embodiment of the invention.

FIG. 9 depicts a graph 900 illustrating the cross-fading of two samples of a virtual instrument, according to an embodiment of the invention. Graph 900 includes an envelope level axis 905, a sample output level axis 910, a soft sample 920, and a loud sample 930. As described above, a legato swipe gesture can trigger playback of two preselected MIDI-controlled audio samples for a virtual instrument, where the velocity of the swipe can control characteristics of the cross-fade and the amplitude of the composite signal. In some aspects, the soft sample 920 can be a first preselected audio sample that includes an audio sample of a bowed stringed instrument having a soft attack and a light timbre. The loud sample 930 can be a second preselected audio sample including an audio sample of a bowed stringed instrument having a strong attack and a heavy timbre. As the velocity of the swipe gesture increases, the playback (i.e., envelope level) of the two preselected audio samples cross-fades from the soft sample 920 (i.e., first preselected MIDI file) to the loud sample 930 (i.e., second preselected MIDI file). In contrast, as the velocity of the swipe gesture decreases, the playback of the two preselected audio samples cross-fades from the loud sample 930 to the soft sample 920. In FIG. 9, at an envelope level (e.g., swipe velocity) of 75 out of 128 levels, the loud sample 930 cross-fades at a higher output level than the soft signal 920. In some embodiments, the playback volume of the cross-faded composite of the two preselected audio samples increases in response to an increased velocity of a legato swipe gesture. In contrast, the playback volume of the cross-faded composite of the two preselected audio samples decreases in response to a decreased velocity of a legato swipe gesture.

Figure 10:
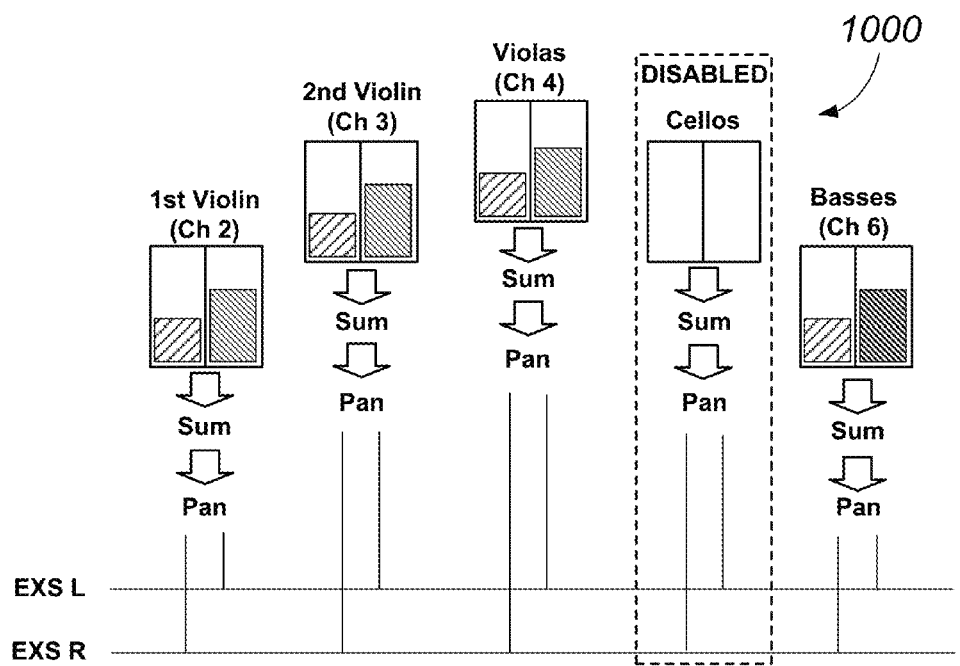
FIG. 10 illustrates a stereo field mapping configuration of a cross-faded composite sample, according to an embodiment of the invention.

FIG. 10 illustrates a stereo field mapping configuration 1000 of a cross-faded composite sample, according to an embodiment of the invention. In each MIDI channel (e.g., virtual instrument), the resulting composite mix of the soft sample and loud sample is summed to a mono signal and panned in a mixer to present a particular stereo spread of the five MIDI channel instruments (e.g., the violins, violas, cellos, and basses) in a stereo field. In other cases, a stereo signal is placed within the stereo field for the final output. In this particular example, the $1^{st}$ violin, $2^{nd}$ violin, violas, and basses are enabled and the cellos are disabled. The resulting mix of soft samples and loud samples for each instrument (i.e., channel) is summed, panned, and added to a master stereo output for playback. In alternative embodiments, additional expression data can be modulated with the cross-faded signals. For example, as low frequency notes are played, haptic feedback (i.e., vibration) can be cross-faded into the composite stereo signal to simulate the rumble of bass frequencies. Similarly, other expression data (e.g., equalization data) can be cross-faded into the output signal as would be appreciated by one of ordinary skill in the art with the benefit of this disclosure.

Dual Fly Wheel Aspect for Modeling a Physical System Response to a User Input

The legato gesture articulation (i.e., tap-and-swipe) provides a realistic sounding bowing action on a stringed instrument due, in part, to a virtual mass modeling system. The mass modeling system can include two series connected signal processors that can be analogized to a virtual dual flywheel system having mass and momentum to create smooth transitions between notes and chords by modeling a virtual momentum created by a user swiping gesture on the interface 100 and maintaining that momentum through subsequent harmonic or melodic progressions.

Figure 11:
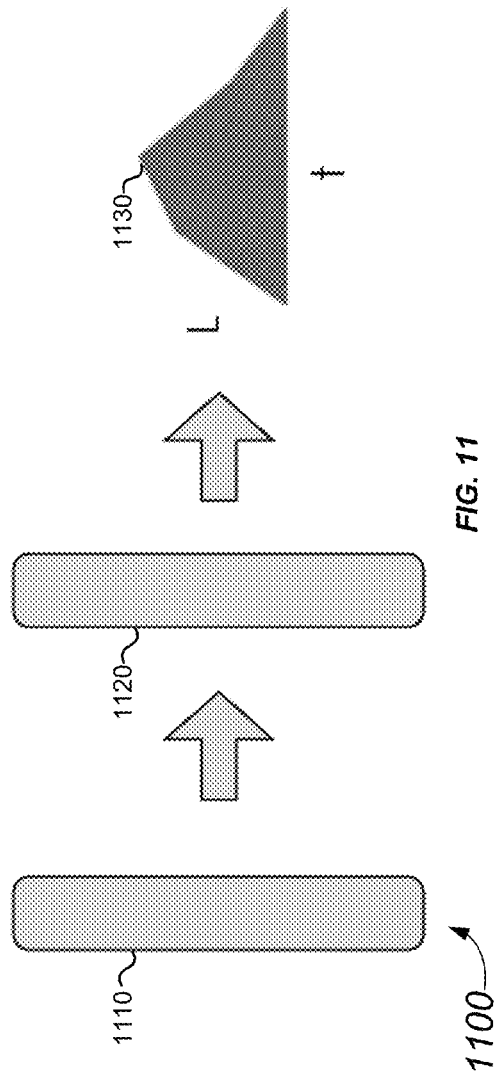
FIG. 11 depicts a dual flywheel mass modeling system, according to an embodiment of the invention.

FIG. 11 depicts a mass modeling system ("flywheel system") 1100, according to an embodiment of the invention. The modeling system 1100 includes a first signal processing stage 1110 with a first input and a first output, and a second signal processing stage 1120 receiving the first output and having a second output. The first user input can include the legato gesture articulation (e.g., up-and-down swiping gesture) for a virtual instrument on the interface 100. The first signal processing stage 1110 is coupled to the second signal processing stage 1120 such that the second input of the second signal processing stage 1120 receives the output of the first signal processing stage 1110. The output of the second signal processing stage 1120 can determine an output expression level for the system 100 (e.g., a volume) in response to the first user input. In some embodiments, the output of the flywheel system 1100 is configured to modulate the lifecycle of a note 1130 played by a virtual instrument. The output of both the first and second signal processing stages 1110, 1120 can be modeled by equation (1):

$$L=(((i*(1-h))+(L'*h))*F_s)+C \qquad (1)$$

The various components of equation 1 are defined as follows: L is current level, speed, or momentum of the given flywheel, and L' is the previous level, speed, or momentum of the given flywheel. The external input 'i' can be a physical user input (e.g., a legato swiping motion on a touch zone) for the first signal processing stage 1110. Alternatively, the external input 'i' can be the output L of the first signal processing stage 1110 as the input to the second signal processing stage 1120. The 'h' variable is a mass coefficient associated with each flywheel and can vary due to a state of the second flywheel (e.g., momentum). 'F' can be a scaling factor and 'C' can be an offset constant. The first term (i*(1−h)) corresponds to an influence of a new input momentum in the system. The second term (L'*h) corresponds to the existing momentum of the system. As can be seen in equation 1, a very high mass coefficient (e.g., 0.9) will require very high input levels to make any appreciable change to the existing momentum. Conversely, very small mass coefficients (e.g., 0.1) will only require small input levels to appreciably change the existing momentum of the particular flywheel. By coupling two virtual flywheels together, the output of the second signal processing stage 1120 depends on a combination of the input from the first signal processing stage 1110 and the current momentum of the second signal processing stage 1120. In an alternative aspect, the momentum can be described as a rectification and low-pass filter of the input signal (e.g., up-and-down swipe gesture over time).

An aspect of the flywheel system 1100 is to determine a resulting expression level (e.g., volume) that produces a realistic sounding transition from one note or chord to the next by maintaining and modulating a virtual momentum developed in the flywheel system 1100. To illustrate this concept, a user may initiate a very soft legato articulation on a touch zone by slowing swiping in an up-and-down motion (e.g., a slow first swipe speed) and gradually increasing speed until a relatively fast and constant rate is achieved (e.g., a fast second swipe speed). This can create the sound of a musical crescendo with the relative volume (i.e., expression data) of the virtual instrument increasing until the volume is commensurate with the momentum created by the constant rate of the input signal. Over a period of time, both signal processing stages 1110, 1120 (i.e., virtual flywheels) will be virtually rotating with the same momentum (e.g., the fast second swipe speed). As the user moves to a different touch zone (e.g., a different chord) and begins a swipe gesture at a slower constant swipe speed (e.g., a third medium swipe speed), the flywheel system 1100 would begin playback of the new chord with a strong volume corresponding to the second fast swipe speed and slowly reduce to a lower volume corresponding to the third medium swipe speed. The rate of change can be dictated by the various terms and parameters of equation 1 that define the virtual mass effect (i.e., momentum) of the flywheel system 1100. It should be noted that the flywheel system 1100 can be applied to many applications other than modeling a lifecycle of a note or chord. For example, the flywheel system 1100 could control drawing/painting applications where the intensity (e.g., color, width of lines, straightness of lines, line characteristics) is modulated based on the output of the flywheel system 1100. Alternatively, the flywheel system 1100 can be configured to control a smart drum machine that alters beat parameters (e.g., beat complexity, fill complexity, sample selection, volume, etc.) based on the output of the flywheel system 1100 to provide a continuously evolving drum track. It should be known that the application of the flywheel system 1100 is not limited to musical applications and may be adapted to many other systems well-suited for continuous modulation and control by a virtual momentum based system.

Figure 12:
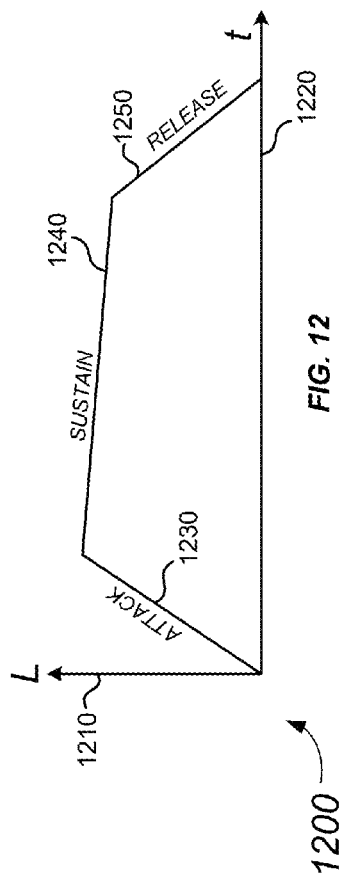
FIG. 12 illustrates an embodiment of a note lifecycle, according to an embodiment of the invention.

FIG. 12 illustrates an embodiment of a note lifecycle 1200, according to an embodiment of the invention. The note lifecycle can be measured in a relative level 1210 (e.g., volume) versus time 1220. The note life cycle 1200 can include an attack phase 1230, a sustain phase 1240, and a release phase 1250. In some embodiments, the note lifecycle can include additional phases including a decay phase or any other characteristic that can be used to model the life cycle of a musical note. The foregoing note lifecycle phases would be readily understood by those of ordinary skill in the art.

Figure 13:
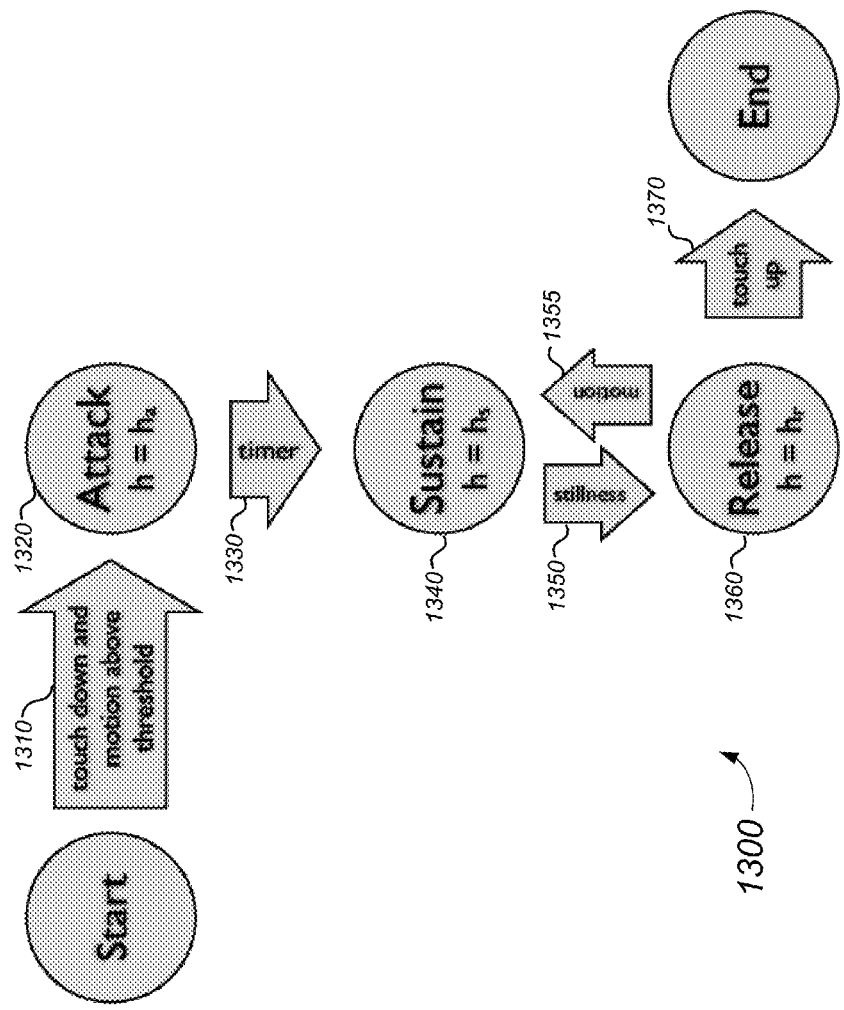
FIG. 13 is a simplified state machine illustrating aspects of modeling a lifecycle of a note played on a virtual instrument, according to an embodiment of the invention.

FIG. 13 is a simplified flow diagram illustrating aspects of a method 1300 of modeling a lifecycle of a note played on a virtual instrument, according to an embodiment of the invention. The method 1300 is performed by processing logic that may comprise hardware (e.g., circuitry, dedicate logic, etc.), software (which as is run on a general purpose computing system or a dedicated machine), firmware (embedded software), or any combination thereof. The method 1300 is discussed in terms of the dual flywheel physical system model 1100 (FIG. 11) as applied to the exemplary system 700 (FIG. 7), which is configured to execute the method 1300.

Referring to FIG. 13, the method 1300 includes receiving a touch down and motion touch gesture (e.g., a legato gesture) on a touch zone 760 of an interface 700 (1310). At 1320, the attack phase of the note or chord begins. In some embodiments, the level (e.g., volume) and rate of attack ($\Delta L/\Delta t$) is based, in part, on a mass coefficient ($h_a$) of the dual flywheel physical system model ("flywheel system") 1100 and the input signal (e.g., legato articulation). After a first predetermined period of time (1330), the attack phase expires. The predetermined period of time for the attack phase 1330 can be a time constant of any suitable length as would be appreciated by one of ordinary skill in the art. At 1340, the note enters the sustain phase. The length and rate of decay ($\Delta L/\Delta t$) of the sustain phase is based, in part, on a mass coefficient ($h_s$) of the flywheel system 1100 and the input signal (e.g., speed of the legato articulation). If the input (e.g., legato gesture) stops for a second predetermined period of time (1350), the sustain phase 1240 expires and the note enters the release phase 1360. The level (e.g., volume) of the release phase decays according to a predetermined time constant. The length and rate of decay ($\Delta L/\Delta t$) of the release phase is based, in part, on a mass coefficient ($h_s$) of the flywheel system 1100. At 1370, a lift-off condition occurs and the method ends.

In certain embodiments, the flywheel system 1100 provides a mechanism to modulate the level and phase of a note lifecycle in real time. As described above, the sustain phase 1340 gradually decreases and eventually enters the release phase 1360 in response to a static input 1350. For example, a level (e.g., output of the second virtual flywheel) of the sustain phase 1340 may decrease below a predetermined value and enter the release phase 1360. In some embodiments, the sustain phase 1340 can be maintained indefinitely provided that there is a continuous input signal 1310. Furthermore, increasing the speed of a swipe gesture can proportionally increase a current level of the sustain phase 1340 in accordance with the virtual momentum characteristics of the flywheel system 1100. In some embodiments, the note lifecycle can return (1355) from the release phase 1360 back to the sustain phase 1340 in response to a sufficiently high input signal (e.g., swipe speed). It should be noted that the "level" described herein can refer to a volume. In addition, level can optionally refer to a relative "momentum" created by the flywheel system 1100, where the different phases (e.g., attack, sustain, release) correspond to a level.

In alternative embodiments, other input signals may be used to modulate the note lifecycle, the flywheel system 1100, or a combination of the two. Other user input signals can include the size of the touch point and/or the acceleration therewith (i.e., detect the pressure or downward force of the input gesture), the angle of the touch signal, multiple touch signals, or any other input signal that would be appreciated by one of ordinary skill in the art with the benefit of this disclosure.

It should be appreciated that the specific steps illustrated in FIG. 13 provides a particular method of modeling a lifecycle of a note played on a virtual instrument, according to an embodiment of the present invention. Other sequences of steps may also be performed according to alternative embodiments. In certain embodiments, the method 1300 may perform the individual steps in a different order, at the same time, or any other sequence for a particular application. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize and appreciate many variation, modification, and alternatives of the method.

Figure 21:
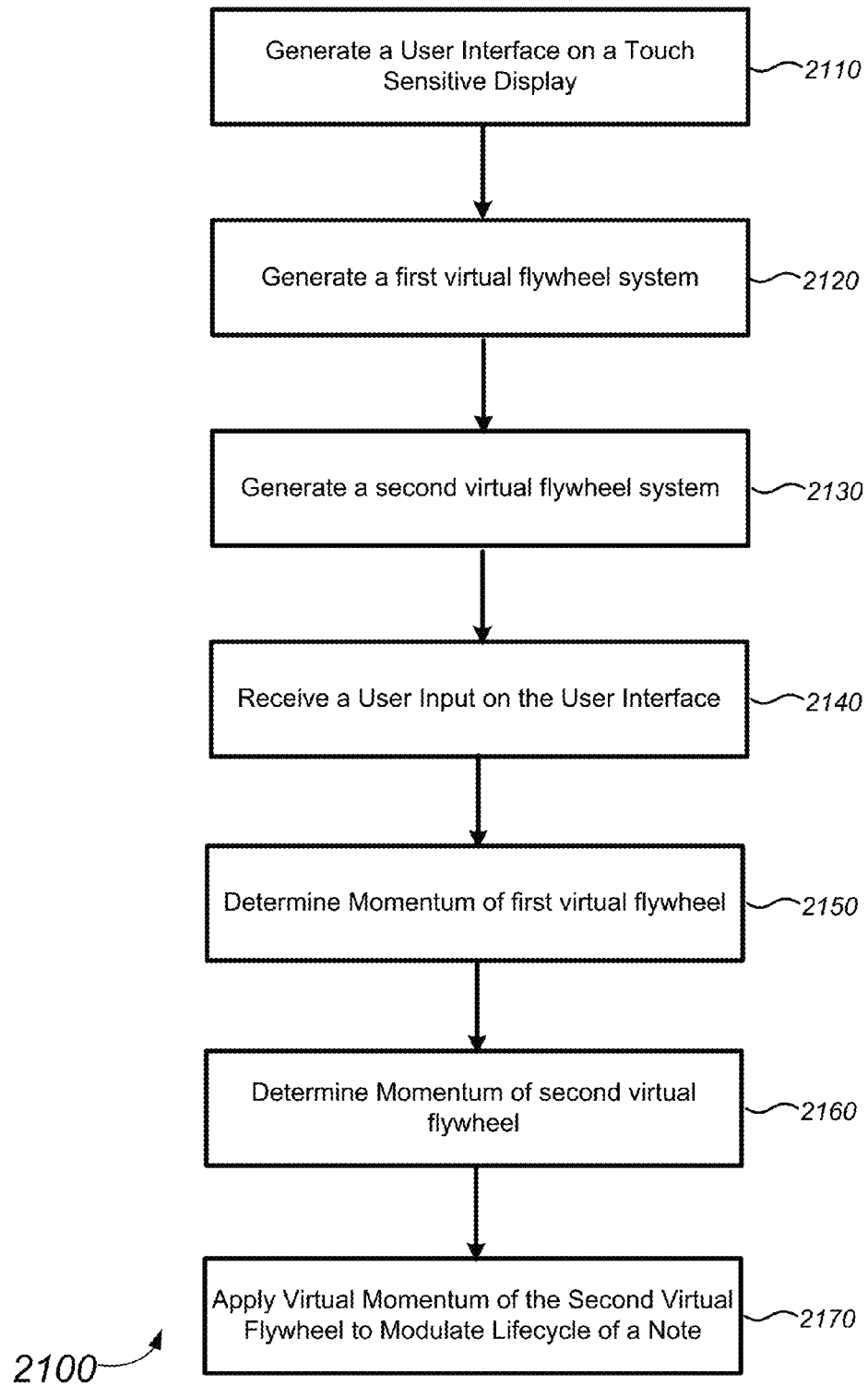
FIG. 21 is a simplified flow diagram illustrating aspects of a method of modulating a lifecycle of a musical note or chord, according to an embodiment of the invention.

FIG. 21 is a simplified flow diagram illustrating aspects of a method 2100 of modulating a lifecycle of a note, according to an embodiment of the invention. Method 2100 is performed by processing logic that may comprise hardware (e.g., circuitry, dedicate logic, etc.), software (which as is run on a general purpose computing system or a dedicated machine), firmware (embedded software), or any combination thereof. In one embodiment, method 2100 is performed by the processor unit 1410 of FIG. 14.

Referring to FIG. 21, method 2100 begins with generating a user interface on a touch sensitive display, at 2110. The touch sensitive display can be similar to the user interface 100 for a virtual musical instrument, as shown in FIG. 1. The user interface can be implemented on any suitable touch sensitive device configured to detect touch input. At 2120, method 2100 further includes generating a first virtual flywheel system (VFS) 1110. The first virtual flywheel system 1110 can include an input and an output, where the input may include a user touch input on the user interface, or any suitable data input (e.g., input signal) from any desired source, as would be appreciated by one of ordinary skill in the art. The output of the first virtual flywheel system can include a data value that may be an expression value, virtual momentum, or other suitable data output that is based, at least in part, on the data input and a mass coefficient associated with the first virtual flywheel. The mass coefficient of the VFS 1110 may be predetermined, a fixed value, a dynamic value, or any suitable value as required. In some cases, the output of the first virtual flywheel 1110 is the product of a magnitude of the data input and the mass coefficient.

At 2130, method 2100 further includes generating a second virtual flywheel system 1120. The second virtual flywheel system (VFS) 1110 can include an input and an output. In some embodiments, the second virtual flywheel system 1120 is series connected with the first virtual flywheel system 1100, such that the output of the first virtual flywheel system 1110 is coupled to the input of the second virtual flywheel system 1120. In some cases, the input to the second virtual flywheel system 1120 may include additional sources (e.g., multiple inputs). The output of the second VFS 1120 can be based wholly, or in part, on the input to the VFS 1120 and a mass coefficient associated with the second VFS 1120. The mass coefficient of the VFS 1120 may be predetermined, a fixed value, a dynamic value, or any suitable value as required. In some cases, the output of the first virtual flywheel 1120 is the product of a magnitude of the data input of the second VFS 1120 and its associated mass coefficient.

At 2140, the user interface receives a user input. The user input can include a touch gesture, swipe gesture, or any suitable input from a user, stylus, or the like, on a touch-sensitive display. Alternatively, the input may be generated by systems other than the touch sensitive variety. At 2150, method 2100 further includes determining a momentum of the first VFS 1110. As described above, the momentum may be based on the input to the FVS 1110 and a mass coefficient associated with the VFS 1110. At 2160, method 2100 further includes determining a momentum of the second VFS 1110. As described above, the momentum of the second VFS 1120 may be based on an input signal to the second VFS 1120 and its associated mass coefficient. The output of the VFS 1120 can be utilized as an expression level, an output level, a dynamic control signal, or the like, as would be appreciated by one of ordinary skill in the art.

At 2170, method 2100 further includes applying the virtual momentum of the second VFS 1120 to modulate a lifecycle of a note or chord. In some embodiments, the output of the VFS 1120 (e.g., expression level) can be used to modulate one or more audio properties of an audio signal. For example, a volume of the audio signal can be controlled in real-time based on a magnitude of the expression level. The output of the VFS 1120 can be used to modulate any system including those not related to audio applications. For example, the expression level may be used to control or modulate visual properties (e.g., colors, intensity, contrast, tone) of a system. In broader contexts, the output of the VFS 1120 can be used to modulate in real-time any desired parameter in any suitable application.

It should be appreciated that the specific steps illustrated in FIG. 21 provides a particular method of modulating a lifecycle of a note, according to an embodiment of the present invention. Other sequences of steps may also be performed according to alternative embodiments. In certain embodiments, method 2100 may perform the individual steps in a different order, at the same time, or any other sequence for a particular application. Moreover, the individual steps illustrated in FIG. 21 may include multiple sub-steps that may be performed in various sequences as appropriate to the individual step. Furthermore, additional steps may be added or removed depending on the particular applications. One of ordinary skill in the art would recognize and appreciate many variation, modification, and alternatives of the method.

Figure 15:
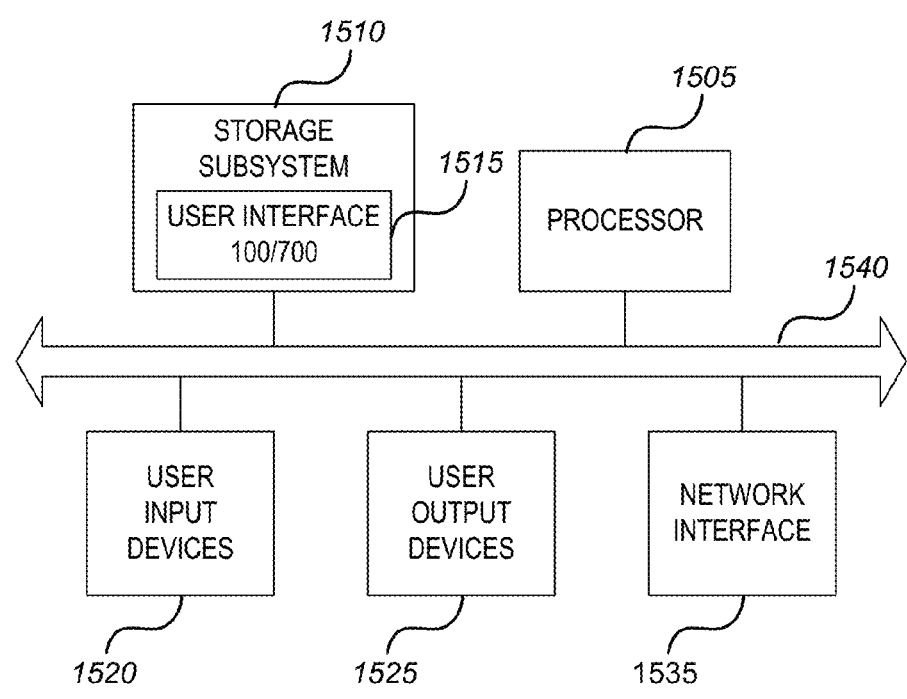
FIG. 15 illustrates a computer system according to an embodiment of the present invention.

FIG. 15 illustrates a computer system 1500 according to an embodiment of the present invention. The user interfaces described herein (e.g., interface 100 and 700) can be implemented within a computer system such as computer system 1500 shown here. Computer system 1500 can be implemented as any of various computing devices, including, e.g., a desktop or laptop computer, tablet computer, smart phone, personal data assistant (PDA), or any other type of computing device, not limited to any particular form factor. Computer system 1500 can include processing unit(s) 1505, storage subsystem 1510, input devices 1520, output devices 1525, network interface 1535, and bus 1540.

Processing unit(s) 1505 can include a single processor, which can have one or more cores, or multiple processors. In some embodiments, processing unit(s) 1505 can include a general purpose primary processor as well as one or more special purpose co-processors such as graphics processors, digital signal processors, or the like. In some embodiments, some or all processing units 1505 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1505 can execute instructions stored in storage subsystem 1510.

Storage subsystem 1510 can include various memory units such as a system memory, a read-only memory (ROM), and a permanent storage device. The ROM can store static data and instructions that are needed by processing unit(s) 1505 and other modules of electronic device 1500. The permanent storage device can be a read-and-write memory device. This permanent storage device can be a non-volatile memory unit that stores instructions and data even when computer system 1500 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 1510 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1510 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 1510 can store one or more software programs to be executed by processing unit(s) 1505, such as a user interface 1515. As mentioned, "software" can refer to sequences of instructions that, when executed by processing unit(s) 1505 cause computer system 1500 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 1510, processing unit(s) 1505 can retrieve program instructions to execute and data to process in order to execute various operations described herein.

A user interface can be provided by one or more user input devices 1520, display device 1525, and/or and one or more other user output devices (not shown). Input devices 1520 can include any device via which a user can provide signals to computing system 1500; computing system 1500 can interpret the signals as indicative of particular user requests or information. In various embodiments, input devices 1520 can include any or all of a keyboard touch pad, touch screen, mouse or other pointing device, scroll wheel, click wheel, dial, button, switch, keypad, microphone, and so on.

Output devices 1525 can display images generated by electronic device 1500. Output devices 1525 can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like), indicator lights, speakers, tactile "display" devices, headphone jacks, printers, and so on. Some embodiments can include a device such as a touchscreen that function as both input and output device.

In some embodiments, output device 1525 can provide a graphical user interface, in which visible image elements in certain areas of output device 1525 are defined as active elements or control elements that the user selects using user input devices 1520. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in output device 1525. Other user interfaces can also be implemented.

Network interface 1535 can provide voice and/or data communication capability for electronic device 1500. In some embodiments, network interface 1535 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 1535 can provide wired network connectivity (e.g., Ethernet) in addition to or instead of a wireless interface. Network interface 1535 can be implemented using a combination of hardware (e.g., antennas, modulators/demodulators, encoders/decoders, and other analog and/or digital signal processing circuits) and software components.

Bus 1540 can include various system, peripheral, and chipset buses that communicatively connect the numerous internal devices of electronic device 1500. For example, bus 1540 can communicatively couple processing unit(s) 1505 with storage subsystem 1510. Bus 1540 also connects to input devices 1520 and display 1525. Bus 1540 also couples electronic device 1500 to a network through network interface 1535. In this manner, electronic device 1500 can be a part of a network of multiple computer systems (e.g., a local area network (LAN), a wide area network (WAN), an Intranet, or a network of networks, such as the Internet. Any or all components of electronic device 1500 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

It will be appreciated that computer system 1500 is illustrative and that variations and modifications are possible. Computer system 1500 can have other capabilities not specifically described here (e.g., mobile phone, global positioning system (GPS), power management, one or more cameras, various connection ports for connecting external devices or accessories, etc.). Further, while computer system 1500 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible: displaying the interface 100/700 and the configuration of the various elements therein, such as the position of touch regions and touch zones, the types of virtual instruments used, the types of chord inversions applied to the touch zones, which may be customizable, customizing aspects of the flywheel system, etc. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented, All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A computer program product tangibly embodied on a non-transitory computer-readable storage medium comprising computer-executable instructions causing a data processing system to:
   generate a momentum modeling system including:
   a first momentum modeling stage configured to generate a first virtual momentum based on a user input and a predetermined virtual mass of the first momentum modeling stage; and
   a second momentum modeling stage configured to generate a second virtual momentum based on the first virtual momentum and a predetermined second virtual mass of the second momentum modeling stage;
   generate a user interface implemented on a touch-sensitive display for a virtual musical instrument; and
   in response to the user input, generate an expression level based on the second virtual momentum, the expression level corresponding to an output of the virtual musical instrument.

2. The computer program product of claim 1 wherein the virtual musical instrument includes a plurality of touch regions, each touch region corresponding to a chord in a musical key and being divided into a number of separate touch zones.

3. The computer program product of claim 1 further comprising applying the expression level to an audio signal to modulate one or more audio properties of the audio signal.

4. The computer program product of claim 3 wherein the one or more audio properties of the audio signal includes a volume of a musical note or chord.

5. The computer program product of claim 3 wherein the one or more audio properties of the audio signal includes a lifecycle of a musical note or chord.

6. The computer program product of claim 5 wherein the lifecycle of the musical note includes:
   an attack phase;
   a sustain phase; and
   a release phase, the sustain phase operable to enter the release phase when the expression level while in the sustain phase drops below a first predetermined value, and the release phase operable to return to the sustain phase in response to the expression level rising above a second predetermined value.

7. The computer program product of claim 6 wherein the attack phase corresponds to a beginning portion of the lifecycle of the musical note or chord.

8. The computer program product of claim 6 wherein the sustain phase corresponds to a middle portion of the lifecycle of the musical note or chord.

9. The computer program product of claim 6 wherein the release phase corresponds to an end portion of the lifecycle of the musical note or chord.

10. A computer-implemented method comprising:
    generating, by the computer, a user interface implemented on a touch-sensitive display;
    generating, by the computer, a momentum modeling system including a first momentum modeling stage and a second momentum modeling stage, the first momentum modeling stage connected to the second momentum modeling stage such that an output of the first momentum modeling stage is coupled to an input of the second momentum modeling stage;
    receiving, by the computer, a user input on the user interface;
    determining, by the computer, a virtual momentum for the first momentum modeling stage based on the user input and a predetermined mass coefficient of the first momentum modeling stage;
    determining, by the computer, a virtual momentum for the second momentum modeling stage based on the virtual momentum of the first momentum modeling stage and a predetermined mass coefficient of the second momentum modeling stage; and
    generating an output based on the virtual momentum of the second momentum modeling stage.

11. The method of claim 10 wherein the user input is a swipe gesture, a magnitude of the user input based in part on a speed or duration of the swipe gesture.

12. The method of claim 10 wherein the output of the second momentum modeling stage modulates a volume or musical characteristic of a musical note or chord.

13. The method of claim 10 further comprising applying, by the computer, the output of the second momentum modeling stage to modulate a lifecycle of a musical note.

14. The method of claim 13 wherein the output of the second momentum modeling stage represents a level, and wherein the lifecycle of the musical note includes:
    an attack phase,
    a sustain phase, and
    a release phase, the sustain phase entering the release phase when the level in the sustain phase drops below a first predetermined value, the release phase returning to the sustain phase in response to the level rising above a second predetermined value.

15. A computer-implemented system, comprising:
one or more processors;
one or more non-transitory computer-readable storage media containing instructions configured to cause the one or more processors to perform operations including:
generate a user interface implemented on a touch-sensitive display;
generate a momentum modeling system including a first momentum modeling stage and a second momentum modeling stage, the first momentum modeling stage being series connected to the second momentum modeling stage such that an output of the first momentum modeling stage is virtually coupled to an input of the second momentum modeling stage;
receive a user input on the user interface;
determine a virtual momentum for the first momentum modeling stage based on the user input and a predetermined mass coefficient of the first momentum modeling stage; and
determine a virtual momentum for the second momentum modeling stage based on the virtual momentum of the first momentum modeling stage and a predetermined mass coefficient of the second momentum modeling stage.

16. The system of claim 15 wherein the user input is a swipe gesture, a magnitude of the user input based in part on a speed of the swipe gesture.

17. The system of claim 15 wherein the virtual momentum of the second momentum modeling stage is an output level operable to modulate a volume or musical characteristic of a musical note or chord.

18. The system of claim 15 further comprising applying the virtual momentum for the second momentum modeling stage to modulate a lifecycle of a musical note.

19. The system of claim 18 wherein the virtual momentum of the second momentum modeling stage represents a level, and wherein the lifecycle of the musical note includes:
an attack phase,
a sustain phase, and
a release phase, the sustain phase entering the release phase when the level in the sustain phase drops below a first predetermined value, the release phase returning to the sustain phase in response to the level rising above a second predetermined value.

20. The system of claim 19 wherein the attack phase corresponds to a beginning portion of the lifecycle of the musical note or chord, the sustain phase corresponds to a middle portion of the lifecycle of the musical note or chord, and the release phase corresponds to an end portion of the lifecycle of the musical note or chord.

* * * * *